(12) United States Patent
Bargallo et al.

(10) Patent No.: US 12,123,823 B2
(45) Date of Patent: Oct. 22, 2024

(54) COATED STRUCTURE WITH A MONITORING SYSTEM, A MONITORING SYSTEM, AND A METHOD FOR MONITORING A CONDITION OF A COATED STRUCTURE

(71) Applicant: HEMPEL A/S, Kgs. Lyngby (DK)

(72) Inventors: Josep Palasi Bargallo, Kgs. Lyngby (DK); Svava Davidsdottir, Kgs. Lyngby (DK); Vadimas Verdingovas, Kgs. Lyngby (DK); Rameez Ud Din, Kgs. Lyngby (DK); Mark Terrell Sutton, Kgs. Lyngby (DK); Steeven Hegelund Spangsdorf, Kgs. Lyngby (DK); Patricia Hernandez-Fernandez, Kgs. Lyngby (DK); Jon Hindsgaul Hansen, Kgs. Lyngby (DK); Annemette Fribo Gottsche, Kgs. Lyngby (DK)

(*) Notice: Subject to any disclaimer, the term of this patent is extended or adjusted under 35 U.S.C. 154(b) by 205 days.

(21) Appl. No.: 17/634,899

(22) PCT Filed: Aug. 12, 2020

(86) PCT No.: PCT/EP2020/072642
§ 371 (c)(1),
(2) Date: Feb. 11, 2022

(87) PCT Pub. No.: WO2021/028480
PCT Pub. Date: Feb. 18, 2021

(65) Prior Publication Data
US 2022/0326141 A1    Oct. 13, 2022

(30) Foreign Application Priority Data
Aug. 12, 2019   (EP) .................................. 19191240

(51) Int. Cl.
*G01N 17/02*    (2006.01)
*C23F 13/04*    (2006.01)
(Continued)

(52) U.S. Cl.
CPC ............. *G01N 17/02* (2013.01); *G01N 17/00* (2013.01); *G01N 17/04* (2013.01); *G01N 27/026* (2013.01);
(Continued)

(58) Field of Classification Search
CPC ...... G01N 17/02; G01N 17/04; G01N 27/026; G01N 17/00; B05D 7/00; C23F 13/04; C23F 13/22; C23F 2213/32
(Continued)

(56) References Cited

U.S. PATENT DOCUMENTS

| | | | |
|---|---|---|---|
| 5,286,357 A * | 2/1994 | Smart | G01N 17/02 324/71.2 |
| 6,911,828 B1 | 6/2005 | Brossia et al. | |

(Continued)

FOREIGN PATENT DOCUMENTS

| | | |
|---|---|---|
| WO | 2011076856 A1 | 6/2011 |
| WO | 2014032844 A1 | 3/2014 |
| WO | 2018213822 A1 | 11/2018 |

OTHER PUBLICATIONS

International Search Report with Written Opinion from PCT Application No. PCT/EP2020/072642, Oct. 30, 2020.
(Continued)

*Primary Examiner* — Raul J Rios Russo
(74) *Attorney, Agent, or Firm* — Workman Nydegger

(57) ABSTRACT

A coated structure with a monitoring system, the structure comprising a base having a base surface, a coating joined to the base surface in a base interface and extending in a thickness direction to an outer coating surface, a sensor
(Continued)

comprising at least one electrode embedded in the coating, an I/O device configured to generate an input signal in the sensor and to read an output signal from the sensor, a data logger configured to log the output signal from the I/O device, and a computer unit configured to use the logged signal from the data logger. To provide improved information related to the condition of the structure or coating, the computer unit is configured to determine at least two separate indexes, each index related to a property of the coating or the structure.

20 Claims, 10 Drawing Sheets

(51) Int. Cl.
  *C23F 13/22*  (2006.01)
  *G01N 17/00*  (2006.01)
  *G01N 17/04*  (2006.01)
  *G01N 27/02*  (2006.01)

(52) U.S. Cl.
  CPC ............ *C23F 13/04* (2013.01); *C23F 13/22* (2013.01); *C23F 2213/32* (2013.01)

(58) Field of Classification Search
  USPC ........................................... 324/700
  See application file for complete search history.

(56) References Cited

U.S. PATENT DOCUMENTS

| | | | | |
|---|---|---|---|---|
| 2014/0184249 | A1* | 7/2014 | Saafi | C09D 1/02 977/734 |
| 2015/0377814 | A1 | 12/2015 | Schindelholz et al. | |
| 2016/0370309 | A1* | 12/2016 | Apdalhaliem | B64F 5/60 |
| 2017/0205333 | A1 | 7/2017 | Friedersdorf et al. | |
| 2018/0003680 | A1* | 1/2018 | Kannajosyula | G01N 29/46 |
| 2018/0011039 | A1 | 1/2018 | Colosimo et al. | |
| 2018/0143126 | A1* | 5/2018 | Williams | G01N 17/02 |
| 2020/0071537 | A1 | 3/2020 | Mahfouz et al. | |

OTHER PUBLICATIONS

European Search Report from corresponding EP Application No. 19191240, Feb. 5, 2020.

Scully et al., "Electrochemical Impedance of Organic-Coated Steel: Correlation of Impedance Parameters with Long-Term Coating Deterioration" J. Electrochem. Soc. vol. 136, No. 4, Apr. 1, 1989, pp. 979-990.

Merten et al., "Re-evaluating Electrochemical Impedance Spectroscopy (EIS) for the Field Inspector's Toolbox: A First Approach", United States, Bureau of Reclamation, Research and Development Office. Science and Technology Program, Materials Engineering and Research Laboratory (U.S.), as early as Dec. 31, 2014, 13 pages.

Mansfeld et al., "Determination of Coating Deterioration with EIS, I. Basic Relationships", Corrosion, vol. 47, No. 12, Dec. 1, 1991, pp. 958-963.

Lee et al., "Correlation Between Surface Deterioration Degree and Electrochemical Impedance Spectroscopy Results for Epoxy Primer-coated Steel," The National Academies of Sciences, Engineering, Medicine, TRB, 17th ITS World Congress, Oct. 25, 2010.

Amirudin, A. et al., "Application of Electrochemical Impedance Spectroscopy to Study the Degradation of Polymer-Coated Metals", Progress in Organic Coatings, vol. 26, No. 1, May 5, 1995, pp. 1-28.

Davis et al. "Use of Embedded Corrosion Sensors and Sensor Blankets to Detect Paint Degradation," Corrosion Jan. 1, 2003, Paper 344, 9 pages.

Ellicks et al., "Continuous Monitoring of Atmospheric Corrosion and Coating Degradation" Paper No. 8834, NACE International, Corrosion, vol. 47, No. 12, Dec. 1, 1991, pp. 958-963.

Agarwala et al., "Corrosion Detection and Monitoring—A Review," Corrosion 2000, Paper 00271, vol. 11, Apr. 1, 2000, pp. 1-19.

Kang et al., "Multi-Channel Electrical Impedance-Based Crack Localization of Fiber-Reinforced Cementitious Composites under Bending Conditions", Applied Sciences, vol. 8, as early as Dec. 31, 2018, 12 pages.

Communication Pursuant to Article 94(3) EPC from Corresponding European Patent Application No. EP20751595.8, Jul. 19, 2024.

* cited by examiner

COATED STRUCTURE WITH A MONITORING SYSTEM, A MONITORING SYSTEM, AND A METHOD FOR MONITORING A CONDITION OF A COATED STRUCTURE

INTRODUCTION

The disclosure relates to a coated structure comprising a base having a base surface, a coating joined to the base surface in a base interface and extending in a thickness direction to an outer coating surface.

A sensor is embedded in the coating, and a data logger is arranged for communicating an input signal and an output signal with the electrode structure. Based on the output signal, a computer unit can provide at least two different indexes, each index related to a property of the coating or the structure.

BACKGROUND

A large variety of structures made e.g. of steel or concrete are painted with a coating system. The coating system may serve different purposes, Inter alia protection against atmospheric degradation including corrosion, fading, and UV-caused degradation etc., reduction of fouling, abrasion resistance, chemical resistance, prevention of reflection, or simply providing an aesthetic appearance.

Under ideal conditions, the coating exhibits a predefined, intended property, e.g. a specific level of protection against ingress of air, water, or corrosive species, and it therefore preserves the intended condition of the structure. Over time, cracks, or coating degradation, i.e. defects or changes in the coating reduce the intended effect, and scheduled maintenance or repair may be necessary.

Degradation of the coating can be caused by external factors such as temperature, exposure to chemicals including water, exposure to UV radiation, etc., and the degradation can be focused e.g. on the binder system or on the pigmentation part of the coating. A symptom of this type of failure is loss of coating integrity or changes in the principle properties of the coating. An early indication of degradation is the presence of water or other chemicals in the coating.

Mechanical failure, i.e. loss of mechanical properties of the coating, e.g. blistering, cracking, detachment, delamination, etc. can be caused by temperature, impact, intercoat adhesion problems between coating layers, fatigue conditions etc.

Corrosion on the surface of a coated structure can occur e.g. if the surface preparation has not been done properly or if there is under-creep corrosion on the film.

Electrochemical impedance spectroscopy (EIS) measurements have been used for decades to measure the dielectric constant of different types of electrolytes. It has been established as a good technique to analyse coatings properties. The quality of polymeric barrier coatings has been studied by EIS. This is reported in "Electrochemical Impedance of Organic-Coated Steel: Correlation of Impedance Parameters with Long-Term Coating Deterioration" J. Electrochem. Soc. 136, 4, 1989, pp. 979-990.

Furthermore, in the paper: "*Correlation between Surface Deterioration Degree and Electrochemical Impedance Spectroscopy Results for Epoxy Primer-coated Steel found correlation between the magnitude of the low frequency impedance and long-term deterioration*", by Lee, Chan-Young, Lee, Seung-Kyoung and Park, Jin-Hwan published in 17th ITS World Congress, a correlation between surface deterioration degree and EIS for epoxy primer-coated steel was found.

EIS is an established method for analyzing the coating degradation and corrosion in standard electrode configuration and in portable cells, based on measurements using electrodes located outside the coating.

SUMMARY

It is an object to improve the ability to monitor a coated structure, particularly for monitoring coating degradation and/or mechanical failure in the form of a loss of mechanical properties of the coating. It is a further object to provide a structure and a system for monitoring corrosion and water on the surface of a coated structure or water in the coated structure.

When used herein, the term "coated structure" is a structure comprising a base and a coating system applied on a surface of the base. A coated structure with a monitoring system is the coated structure with the sensor, the I/O device and the computer unit as specified in the claims.

According to these and other objects, the disclosure in a first aspect provides a coated structure with a monitoring system. The coated structure comprises a base having a base surface, a coating joined to the base surface in a base interface and extending in a longitudinal direction along the base surface and in a thickness direction to an outer coating surface, a sensor comprising at least one electrode embedded in the coating.

I/O device is configured to generate an input signal in the sensor and to read an output signal from the sensor.

A data logger is configured to log the output signal from the I/O device, and a computer unit is configured to process the logged signal from the data logger to determine at least two different indexes, each index related to a property of the coating or the structure.

The computer unit may particularly process the logged signal with a first algorithm to provide a first index and process the logged signal with a second algorithm to provide a second index.

In one embodiment, the data logger is constituted by the computer unit itself, in another embodiment, the data logger is constituted by the I/O device, and in one embodiment, it is a separate unit.

The following non-limiting list of examples demonstrates different ways to implement the monitoring system.

1. Since the same monitoring system provides two separate indexes, it may provide the indexes simultaneously, using the same sensor. If the I/O device provides a frequency sweep, the indexes may be provided by use of the same frequency sweep, they can be defined by use of the same power supply, the same electronics etc. Therefore, both of the at least two separate indexes may be defined in a consistent manner. This provides enhanced opportunities for comparing the two indexes or for combining the two indexes.
2. The at least two separate indexes may express different properties, e.g. water diffusion, degradation, ion presence, corrosion, or cracking, and the at least two indexes could be combined to define a condition value expressing a further condition of the coated structure which condition value depends on several separate indexes.
3. At least two indexes may be derived at different locations, e.g. different levels, in the coating. In this example, both indexes could relate to the same properties or to different properties. Again the at least two indexes could be combined to define a condition value, e.g. expressing a difference between indexes at different locations.

4. At least one index may form a reference index which can be used during curing of the coating.
5. At least one index may be determined based on a sinus shaped AC signal and another of the at least two indexes may be based on a pulsed DC signal.
6. The computer unit may be programmed with a first algorithm applied to the output signal to obtain a first index and programmed with a second algorithm applied to the output signal to obtain a second index.

When used herein, the property of a coating or structure is considered as a certain characteristic of the coating or structure, and particularly a characteristic which can be observed and expressed by the presence of certain elements such as water, ions such as chloride, corrosion, or degradation, and particularly elements which change over time. In the following, the term "property" simply refers to the presence of one or more of these elements.—i.e. a property of the coating could be water on or in the coating, it could be presence of ions, it could be degradation of the coating, or it could be cracking of the coating. Likewise, a property of the base may be corrosion of the base or cracking of the base. When ions are mentioned herein, it may particularly be chloride ions.

One index may define a property selected from the group consisting of: water diffusion, degradation, ion presence, cracking of the base and/or coating, and corrosion of the base. The other index may define the same or another characteristic selected from the same group.

One of the at least two indexes may define a property at one location, and another of the at least two indexes may define the same or another property at another location. In one example, the two different locations may be sideways shifted in a direction parallel to the base surface or the outer coating surface, and in another example, the locations are shifted relative to each other in a direction perpendicular to the base surface or outer coating surface, herein referred to as a thickness direction.

By using the same sensor, I/O device, data logger, and computer unit to determine two separate indexes, both indexes are established with the same conditions and for the same location. This improves the ability to combine the two indexes e.g. by establishing a correlation between the two separate indexes. Such a correlation may express a coating condition.

In one specific example, one index may define water content and the other index may define coating degradation. If water is detected but the coating degradation is not detected, the expected condition may be considered relatively good whereas if both water content and coating degradation is detected, the coating condition is considered much worse.

In one embodiment, different conditions of the base or coating may be expected based on a combined value of the two separate indexes.

Particularly, the embedment of electrodes into the coating allows e.g. for an EIS measurement method with the purpose to improve the existing systems for determining conditions of a coated structure, and particularly to provide specific knowledge for specific parts of the coated structure.

When used herein, the term "monitoring coating degradation" means following how the coating changes over time.

The base may e.g. be an item made of steel, carbon fibers, composite materials, or concrete, e.g. part of a ship, a pipe, e.g. in an oil or gas installation, a pressure vessel, a ballast or storage tank, a bridge, a wind blade, an airplane, a car, or any similar kind of structure for which coating systems are typically used to protect against degradation or to improve appearance. It follows that when the monitoring system is used for monitoring corrosion, the base is a corrodible material such as steel.

The disclosure may particularly relate to structures where traditional inspection is difficult and expensive. This applies particularly to structures which are difficult to access.

In some embodiments, the base in addition to be covered by a coating is also covered by an insulating layer applied (typically) at the point of final manufacture or otherwise after assembly in the field. Corrosion under insulation (CUI) is a well-known problem across many industries, including refining, petrochemical, power, industrial, onshore and offshore industries. CUI may occur for example as a result of water penetration. CUI most commonly occurs on insulated carbon and low alloy steel and stainless steel equipment that operate at specific temperatures. One form of corrosion under insulation is sweating corrosion where the operating temperature of the pipe is below the atmospheric dew point.

Since the corrosion is hidden under the insulation, CUI most often tends to remain undetected until the insulation is removed for inspection or when leaks occur. If left undetected, CUI can result in severe leaks, equipment failure, prolonged downtime due to repair or replacement, and safety and environmental concerns.

Proactive monitoring of corrosion and/or coating degradation has a relatively high cost because an assessment requires removal of the insulating material and maybe also the coating to conduct a visual or other quantitative inspection of the coating or base, where after a new protective coating and/or insulation layer must be reapplied. Removal and reapplication of an insulation layer and potentially also the underlying coating is costly and provides further potential for damaging coating and the protection that it offers to the base. Situations may occur where removal of the insulation layer reveals a coating and base in an acceptable mechanically stable condition. In this case, the cost for evaluating the coating or base could have been avoided since no remedial action would have been necessary. In one embodiment, the coated structure is a base which is coated and insulated. Such a base may form a pipe, i.e. an insulated structure such as a pipe. Corrosion resistant coatings for application under insulation have been disclosed in for example US 2020/071537 and WO 2018/213822.

In another embodiment, the coated structure is a storage tank or a ballast tank of a partly or fully submersible structure, such as a vessel or a semi-submersible oil rig. The inside of tanks is generally prone to corrosion due to the presence of water or water vapor, typically sea water, when ballast is required. Proactive monitoring of tanks and ballast tanks is costly since they are difficult to access, and they have to be taken out of operation during inspection.

Examples of partly or fully submersible structures include vessels (including but not limited to boats, ocean liners, tankers, container ships and other cargo ships, submarines and naval vessels of all types), offshore oil facilities, offshore wind power generation facilities, and subsea pipelines.

In situations where inspection is difficult and costly, the indexes may therefore be very useful in providing information without having to access the structure physically.

The base surface is an outer surface of the base, and it is the surface onto which the coating is applied.

The base interface is the interface between the coating system and the base. It is typically a sensitive part of the structure and delamination where the coating separates from the base surface may cause rapid degradation of the base. Particularly, degradation at the base interface may be difficult to identify if the coating as such is intact.

When used herein, the term "thickness direction" refers to the direction from the base surface to the outer coating surface and perpendicular to the base surface. This constitutes the thickness of the coating.

The coating could be constituted by any kind of paint system etc., preferably one or two component paint systems for steel or concrete, such as coating systems for reducing water diffusion. The latter are well known e.g. for pipe protection or protection in water ballast tanks of ships.

The coating may comprise a resin matrix material forming the binder, e.g. an acrylic polymer, an alkyd polymer, or an epoxy polymer. The coating may e.g. comprise the following binders: Acrylic, epoxy, polyaspartic, polyurethane, polysiloxane, alkyd, zinc silicate, silicone, polyuria Hybrid technologies: epoxy/acrylic, epoxy/siloxane, epoxy/zinc silicates.

The coating may comprise a pigment, e.g. providing color or constituting filler material. Any color of the pigment may be considered, e.g. yellow, orange, red, violet, brown, blue, green, or black which are part of the official pigment numbering system e.g. described as pigment white xxx (x=1 to 999), pigment yellow xxx (x=1 to 999), pigment orange (x=1 to 999), pigment red xxx (x=1 to 999), pigment brown (x=1 to 999), pigment violet (x=1 to 999), pigment green (x=1 to 999), pigment blue P.B. (x=1 to 999), pigment black (x=1 to 999) or the like.

Examples of such pigments are: zinc oxide, zinc containing phosphate and polyphosphate, iron oxide, aluminum containing phosphate, zinc borate, graphite, carbon black oxide, coated mica, fluorescent pigments, cuprous oxide, aluminum paste pigment (leafing and non-leafing type), metallic pigments, zinc dust, organic pearl pigment, ammonium polyphosphate, colored silica sand, polyacrylic acid/calcium carbonate, azo-, phthalocyanine and anthraquinone derivatives (organic pigments), and titanium dioxide (titanium(IV) oxide), etc.

The coating may e.g. comprise the following fillers: Carbonates such as: Calcium carbonate, calcite, dolomite (=calcium/magnesium carbonate), magnesium silicate/carbonate, polycarbonate. Included are also mixtures, calcined grades and surface treated grades. Silicates such as: Aluminum silicate (kaolin, china clay), Magnesium silicate (talc, talc/chlorite), Potassium Aluminum silicate (plastorite, glimmer), Potassium Sodium Aluminum silicate (nepheline syenite), Calcium silicate (wollastonite), Aluminum silicate (bentonite), phyllo silicate (mica). Oxides: Silicon dioxide such as quartz, diatomite, metal oxides such as calcium oxide, aluminum oxide, iron oxide and micaceous iron oxide. Hydroxides/hydrates such as: Aluminum hydroxide, Aluminum trihydrate, Sulphates: barium sulphate. Other fillers: Barium metaborate, silicon carbide, Perlite (volcanic glass), Glass spheres (solid and hollow), glass flakes, glass and silicate fibers, organic fibers, polyvinylidene chloride acrylonitrile, polystyrene acrylate.

Included are also mixtures of the above fillers as well as grades which are natural, synthetic, calcined or surface treated.

The coating system could comprise several layers of paint, e.g. including a primer, e.g. an anticorrosive primer applied to the base surface. The base surface could, initially, be treated e.g. by abrasive blasting. On top of one or more layers of primer, the coating may include one or more layers of an intermediate coat such as a coating which promotes adhesion, and/or one or more layers of a top coat. The top coat could e.g. comprise one or more layers of a fouling control surface coating system, which is particularly useful for marine structures. The electrodes could be arranged between such different layers of paint.

The anticorrosive primer could for example be an epoxy-type anticorrosive primer, and it may be a zinc containing or zinc-free primer. An example of an anticorrosive primer with an epoxy based binder system can be found in WO 2014/032844.

The different layers of paint could be based on epoxy, silicone, or polyurethane and it may include for example a fouling control surface coating system comprising one or more antifouling coats, or a silicone system, where the silicone system can comprise similar or different layers of silicone coatings. An example of a suitable top coat for fouling control can be found inter alia in the patent publication WO 2011/076856.

The I/O device communicates the input and output signal with the sensor based on a known principle, e.g. based on electrochemical impedance spectroscopy (EIS) and using e.g. an AC signal. For more information related to EIS, reference is made to for example "Application of electrochemical impedance spectroscopy to study the degradation of polymer-coated metals" by A. Amirudin, D. Thieny, Progress in Organic Coating, volume 26(1):1-28; *"Determination of Coating Deterioration with EIS"*, F. Mansfeld, C. H. Tsai, Corrosion, 1991, Vol 47 (12): 958-963; *"Re-evaluating Electrochemical Impedance Spectroscopy (EIS) for the Field Inspector's Toolbox: A First Approach"*; B. J. Merten, A. Skaj a, D. Tordonato, D. Little published in United States, Bureau of Reclamation, Research and Development Office. Science and Technology Program, Materials Engineering and Research Laboratory (U.S.) 2014; *"Use of Embedded Corrosion Sensors and Sensor Blankets to Detect Paint Degradation"*; G. D. Davis and C. M. Dacres, Corrosion 2003, Paper 3441; *"Continuous Monitoring of Atmospheric Corrosion and Coating Degradation"* D. Ellicks, F. Friedersdorf, M. Merrill, P. Kramer NACE-2017-8834 March 2017. These and several other publications explain the principles of determining deterioration e.g. by use of EIS.

The coated structure may be a CUI structure where the coating is in a non-visible area and the sensor is used to detect degradation of the coating, or under film corrosion. The I/O device may particularly be configured for an AC signal or for a pulse DC signal. In such an implementation, the index may e.g. relate to a combination between two of "water detection", "coating degradation", "corrosion", and/or "cracking". Particularly, it may be advantageous to detect the first three mentioned indexes.

The communication may use a cabled connection between the I/O device and the sensor, or the communication may be wireless, e.g. by induction, RFID etc. Particularly, the communication may include a cabled connection to the sensor by use of a cable extending into the coating.

The sensor may comprise at least two electrodes. The electrodes are spatially separated. The term "spatially separated" means that the electrodes are not in direct electrically conductive contact with each other, since they are separated e.g. by air, paint, or other dielectric matter. Even when the paint is conductive, it may separate electrodes spatially, particularly when the conductive paint has a conductivity different from the conductivity of the electrodes.

The at least one electrode could be made from a conductive material, e.g. silver, copper, aluminum, carbon, or a material from the carbon family including graphene, graphite etc., iron, zinc, and any of their composites etc. In a preferred embodiment, the conductive material is silver. They could be printed onto or arranged as a predefined tag onto the base surface, the outer coating surface, or an intermediate surface of a layer of coating material constituting the coating. Accordingly, the designation of the sensor with one or more electrodes being embedded in the coating means one or more electrodes are located underneath, in, or on top of the coating or in-between layers of coating in such a way that the properties of the structure or coating can be determined from the signal in the sensor.

Ways of applying the sensors may include for example stamping, printing, transferring from a carrier material, doctor blade application or painting.

In one embodiment, the electrode is supported by a carrier material. Carrier material, herein, denotes a film of any kind which holds the electrode in place at least until it is supported by the coated base, i.e. until the coated structure is made. The carrier material may allow the electrode to be defined in advance for application to the base. In a preferred embodiment, the carrier material has been removed after application of the electrode allowing a free flow of water and ions around the electrodes.

In one embodiment, the electrodes may e.g. be painted, or printed from liquid conductive ink, and thus not supported by a carrier material.

By use of at least one single electrode, the index may relate to cracking. However, particularly, the sensor may have at least two electrodes enabling capacitance measurement and use of EIS e.g. for detecting water and degradation. Therefore, with two electrodes, the index may particularly relate to water and degradation.

The electrodes could have different shapes, sizes or configurations. In one embodiment, the electrodes comprise at least one elongated and long electrode, in another embodiment, one electrode has a tortuous shape, and in another embodiment, at least one electrode forms a comb pattern. In one embodiment, two electrodes form a comb pattern where the fingers of the pattern of one electrode are interleaved between the fingers of the pattern of the other electrode.

The computer unit uses the output signal for determining the at least two indexes. The input signal and the output signal may particularly be an AC signal.

When used herein, the term "index" is a measure for a property of the coated structure. An example of an index could be a number on a scale expressing a property such as water diffusion, degradation and ion presence cracking of the coating or the coated structure, or corrosion. These properties are mentioned throughout this description as examples of properties of the coated structure, but other properties could be relevant, e.g., delamination etc. While the index is a measure for such a property, it may depend on certain conditions. By means of an example, the input signal and output signal may be AC signals, and the computer unit may determine a capacitance based on impedance and a phase shift between the input and output signals. The capacitance is significant for water content in or at the coated structure and may be taken as one of the two indexes. The relation between the capacitance and the water content depends on different other factors, e.g. the temperature and the humidity. Accordingly, while the index is a measure of the property, it may depend on other factors.

The computer unit may particularly be configured to determine at least one of the two indexes by EIS. This could be by use of an AC signal with a sinus shape, or a signal with a wave shape, or a triangle shape. Alternatively, at least one of the at least two indexes could be found by use of a DC pulse signal. In that case, a delay between the input signal and the output signal is determined. The delay is significant for a capacitance, and the capacitance is significant for presence of water or other chemicals, or significant for temperature or humidity. The procedure of detecting water is described in detail later and includes in addition to measuring a phase shift also calculation of impedance which is frequency dependent.

Resistance in a DC pulse signal can be determined from the amplitude and is significant for cracking or material change including degradation.

In one embodiment, the sensor may comprise at least three electrodes, and the computer unit may be configured to determine one of the two indexes by EIS. This is done by use of a first set of two of the three electrodes, and to determine the other of the two indexes by EIS by use of a second set of two of the at least three electrodes.

The input signal may define a first electrical field between the first set of electrodes and a second electrical field between the second set of electrodes. The first and second electrical fields may define field curves with different size or shape. This may be used for what herein is referred to as "detection volume". By detection volume is meant, that the measuring field e.g. may be used for:

Determining water in the coating: This may be obtained by a spatial distance between the electrodes being less than the distance from the electrode to the outer coating surface and being less than the distance from the electrode to the base interface.

Determining film corrosion: This may be obtained by a spatial distance between the electrode being smaller than the distance from the electrodes to the outer coating surface and larger than the distance from the electrodes to the base interface.

Determining water formation of the top coating layer: This may be obtained by a spatial distance between the electrode being larger than the distance from the electrode to the outer coating layer and smaller than the distance from the electrode to the base interface.

Determining Cracking. This may particularly be one single electrode having a straight or elongated shape where the resistance changes upon destruction of the electrode. It could be a single electrode having multiple lines, e.g. parallel lines which would also allow determining the size of a crack. If half of the lines are broken, then the crack would have the length comparable to the length of half of the pattern of lines. Under film corrosion can be detected, and failure in the sensor can be detected, e.g. if one of the electrodes is broken. The latter can be used to define if there is cracking in the coating at a location of a sensor. This is done by measuring the conductivity between two edges of the electrode. If the conductivity is zero, then the electrode is broken and that could be caused by cracking in the coating.

In one embodiment, the field curve of the first electrical field for a specific field strength extends to the outer coating surface, and the field curve of the second electrical field for the same specific field strength does not extend to the outer coating surface.

The specific field strength for which the field curves of the first and second fields are compared, could e.g. be the 95 percent field strength curve or the 99 percent field strength curve.

In one embodiment, the field curve of the first electrical field for one specific field strength may also extend to the base interface, and the field curve of the second electrical field for the same field strength may not extend to the base interface.

In one embodiment of this kind, the field curve of the first electrical field for one specific field strength extends to the base interface and to the outer coating surface, and the field curve of the second electrical field for the same field strength does not extend to the base interface and outer coating surface.

The computer unit may be configured to use the electrical signal existing between the electrodes of the first set of electrodes and the electrical signal existing between the electrodes of the second set of electrodes, e.g. simultaneously, and to determine the at least to indexes.

In the above examples of different sizes of the field curves, the control structure may therefore be configured to generate information related to the outer coating surface, to the base surface, to the base interface, and/or to locations within the coating simultaneously and by use of the signals from the different sets of electrodes simultaneously.

The distance between the electrodes of the first set of electrodes may be different from the distance between the electrodes of the second set of electrodes. Alternatively, or in combination, at least one feature of the electrodes of the first set of electrodes, such as one of the size, the shape, the configuration and/or the material of the electrodes of the first set of electrodes may be different from the material of the electrodes of the second set of electrodes. The above-mentioned different distances, sizes, shapes, or materials may create different field curves for the same electrical field strength.

In one embodiment, the first set comprises a first electrode and a second electrode, and the second set comprises a third electrode and a fourth electrode. In an alternative embodiment, the first set comprises a first electrode and a second electrode, and the second set comprises the second electrode and a third electrode.

Two, three, four, five or more sets, each comprising two electrodes may be defined.

The electrodes may be located in different depths within the coating. In one embodiment, the electrodes of the first set of electrodes may be located in different depth in the thickness direction relative to the electrodes of the second set of electrodes. This would also create field curves with different origins and therefore with the ability to provide properties for different areas of the structure or coating.

One of the at least two indexes may be derived from electrodes in one depth within the coating and another of the at least two indexes may be derived from electrodes in another depth within the coating. In this embodiment, the indexes can be used to derive a combined value based on at least two indexes deriving from electrodes in different depths.

In one example, a first one of the two indexes derives from electrodes near the outer surface of the coating, e.g. 150 μm from the outer surface, and a second one of the at least two indexes derives from electrodes less near the outer surface of the coating, e.g. 300 μm from the outer surface. In this case, both indexes may relate to water, or they may both relate to one of the other properties mentioned earlier, e.g. degradation, corrosion, or cracking. If the first index indicates higher water content than the second index, the difference between the indexes may indicate a speed of penetration of water into the coating. In this case, the combined value may indicate speed of penetration. Separate indexes may be provided e.g. for 2, 3, 4, 5 or more different depths in the coating.

In one embodiment, one or more electrodes are covered by an insulating material, e.g. a polymer or ceramic material, or anything which is less conductive than the electrodes. That may change the ability of the field curves to propagate and may therefore create different field curves for the same electrical field strength. The insulating material may be applied on or near one or more of the electrodes in different thicknesses to thereby control and provoke different field curves from the electrodes.

In one embodiment, the computer unit is configured to measure conductivity, or resistance between the edges of one or more of the electrodes. This can reveal if the electrode is still working and can predict cracking of the electrodes or the structure and coating.

Index for cracking could be determined e.g. as expressed e.g. in the article "Multi-Channel Electrical Impedance-Based Crack Localization of Fiber-Reinforced Cementitious Composites under Bending Conditions", by Man-Sung Kang, Hanju Lee, Hong Jae Yim, Yun-Kyu An and Dong Joo Kim; published by Applied Sciences MDPI, 2018.

The computer unit may be configured to use the logged signal to define the at least two separate indexes simultaneously.

The coating may comprise different layers of paint, e.g. a first layer of paint and a second layer of paint. Each layer comprises opposite inner and outer surfaces, the inner surfaces being joined in a coating interface. The outer surface of the first layer may e.g. be joined to the base in the base interface.

In this embodiment, at least one of the at least two electrodes of the sensor may be located in the coating interface.

The first layer may have a first thickness and the second layer may have a second thickness being different from the first thickness.

In one embodiment, one of the at least two indexes relates to the base interface and another of the at least two indexes relates to the outer coating surface.

At least one of the at least two indexes may relate to the base interface and another of the at least two indexes may relate to the outer coating surface.

At least one of the at least two indexes may relate to cracking within the coating system, or barrier properties of the system, or water permeability within the coating, or under coating corrosion at the base surface, water formation above the coating on the outer coating surface, curing degree, or film formation, where film formation covers curing or evaporation.

The computer unit may be configured to use resistance in one of the at least two electrodes of the sensor to determine an index related to cracking in the coated structure. This may be carried out by determining the resistance of one of the electrodes shortly after the coated structure is made and store that resistance as a reference resistance. Throughout the lifetime of the coated structure the resistance of that electrode can be compared with the reference resistance and if the difference exceeds a threshold, it can be considered as an indication of cracking in the coating etc.

The computer unit may be configured to receive configuration data being logged during curing of the coating, and to generate a reference pattern based on the configuration data, the computer unit may further be configured to use the reference pattern to determine a level degradation of the coating. Particularly, the data logged during curing may be logged during the first 10-20 hours after the coating is applied. In this time frame, polymerization of the coating may occur and the signal which can be obtained is comparable to the corresponding signal obtainable during degrading. Accordingly, the data which is logged during curing may be used as a reference, and when a similar signal is observed later in time, it may be taken as an indication of degradation. The computer unit may therefore be configured to compare the reference pattern with later obtained signals, i.e. comparing the reference pattern with logged output data.

The output from the electrodes typically depends on temperature. Particularly, measurement of capacitance depends on temperature and may further depend on humidity etc. but also resistance measurement, impedance measurement, and inductance measurement depend on temperature. Accordingly, the computer unit may communicate with a temperature sensor configured to determine a temperature of the coating. The temperature may be stored and used for correlation and correction of the output signal.

In one example, the temperature is used to define at what temperature the curing, degradation, water content or other property of the coated structure was indexed.

In one example, the abovementioned reference pattern is adjusted based on the temperature before comparing the reference pattern with a specific signal obtained later in time.

The computer unit may be configured to provide one of the at least two indexes so that it relates to a property selected from the group consisting of: water diffusion, degradation, ion presence, cracking of the base and/or coating, and corrosion of the base, and wherein the computer unit is configured to provide another of the at least two indexes so that it relates to the same or another property selected from the same group. For that purpose, the aforementioned ways of determining indexes representing such properties may be programmed into the computer unit.

Particularly, the computer unit may be configured to determine the indexes based on a frequency sweeped input signal. The I/O device may therefore be configured to generate the input signal in the form of a frequency sweep, and the computer unit may be configured to use the logged signal from the data logger and to determine at least two separate indexes based on the same frequency sweep. This allows enhanced options for comparing the two indexes or for using the two indexes in combination to provide a value, e.g. an expected condition value as mentioned earlier herein. Since the indexes are derived from the same frequency sweep, differences due to tolerances in frequency sweep does not occur.

Frequency sweep means that the input signal is provided at a frequency which is varied within a specific band width such as 0.1 to 100,000 Hz.

In a second aspect, the disclosure provides a monitoring system for integration in a coated structure, the coated structure comprising a structure having a base surface, a coating joined to the base surface in a base interface and extending in a thickness direction to an outer coating surface, and a sensor comprising at least one electrode embedded in the coating, the monitoring system comprising:
an I/O device configured to generate an input AC signal in the sensor and to read an output AC signal from the sensor,
a data logger configured to log the output AC signal from the I/O device, and
a computer unit configured to utilize the logged signal from the data logger and to determine at least two separate indexes, each index related to a property of the coating or structure.

In a third aspect, the disclosure provides a method for monitoring a condition of a coated structure, the coated structure comprising a structure having a base surface, a coating joined to the base surface in a base interface and extending in a thickness direction to an outer coating surface, and a sensor comprising at least one electrode embedded in the coating, the method comprising the steps of:
generating an input signal in the sensor and reading an output signal from the sensor,
using a computer unit for determining at least two separate indexes based on the output signal, each index related to a property of the coating.

In a fourth aspect, the disclosure provides the use of a sensor comprising at least one electrode embedded in a coating of a coated structure for obtaining at least two indexes, each index being related to a property of the coating by:
generating an input signal in the sensor and reading an output signal from the sensor, and
applying a first algorithm to the output signal to obtain a first index and applying a second algorithm to the output signal to obtain a second index.

Any of the features mentioned relative to the first aspect of the disclosure may apply also to the monitoring system of the second aspect and to the method of the third aspect of the disclosure.

LIST OF DRAWINGS

In the following, embodiments will be described in further details with reference to the drawing in which:

FIGS. 1*a-d* illustrate a structure with coating and a sensor comprising electrodes embedded in the coating;

DESCRIPTION OF EMBODIMENTS

It should be understood that the detailed description and specific examples, while indicating embodiments, are given by way of illustration only, since various changes and modifications within the spirit and scope of the disclosure will become apparent to those skilled in the art from this detailed description.

Figure 1A:
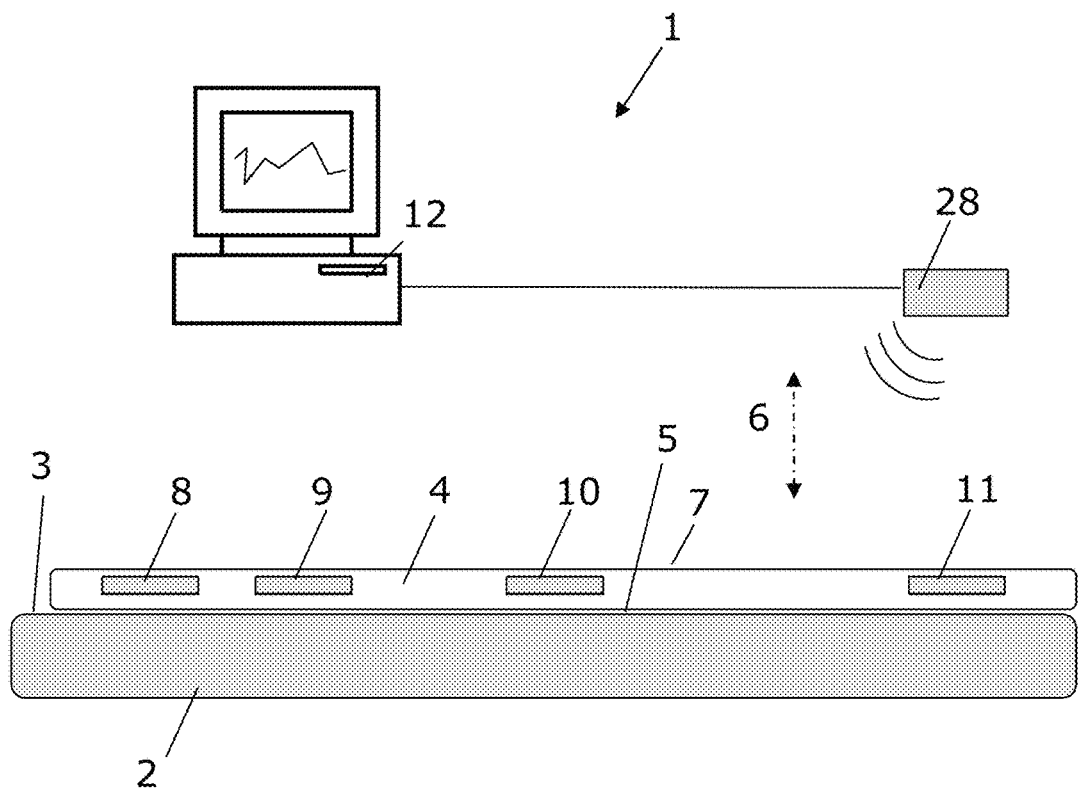

FIG. 1*a* illustrates a coated structure 1 with monitoring capabilities. The coated structure comprises a base 2 made for example of steel. The base has a base surface 3 which is protected by coating 4. The coating is joined to the base surface in a base interface 5, and the coating extends in a thickness direction illustrated by the arrow 6 and thereby forms a thickness of the coating. The coating forms an outer coating surface 7 facing away from the base 2.

A sensor comprising four electrodes 8, 9, 10, 11 is embedded in the coating. Two of the four electrodes, 8, 9 constitute a first set of electrodes and the other two electrodes 10, 11 constitute a second set of electrodes.

The potentiostat 28 communicates an AC signal with the sensor by inducing a signal into the sensor and reading an output signal from the sensor. The potentiostat forms an I/O device within the meaning of this context. The I/O device may be in wired connection with the electrodes of the sensor, or, as illustrated in FIG. 1, it may communicate wirelessly with the electrodes. Wireless communication enables complete embedment of the electrodes in the coating and thereby provides a more robust system.

The I/O device may particularly provide a frequency sweeped input signal, e.g. in the frequency range 0.1-100,000 Hz.

The I/O device communicates electrical signals with the computer unit 12, and the computer unit is configured to derive a condition of the coating, a condition of the base, or a condition of the base interface from the electrical signal from the sensor.

Due to the two categories, i.e. the first and second set of electrodes, the computer unit can determine at least two different properties of the coated structure, herein referred to as first and second indexes or further indexes.

FIG. 1a illustrates an embodiment where the electrodes 8, 9, 10, 11 are located side by side in the same depth within the coating.

Figure 1B:
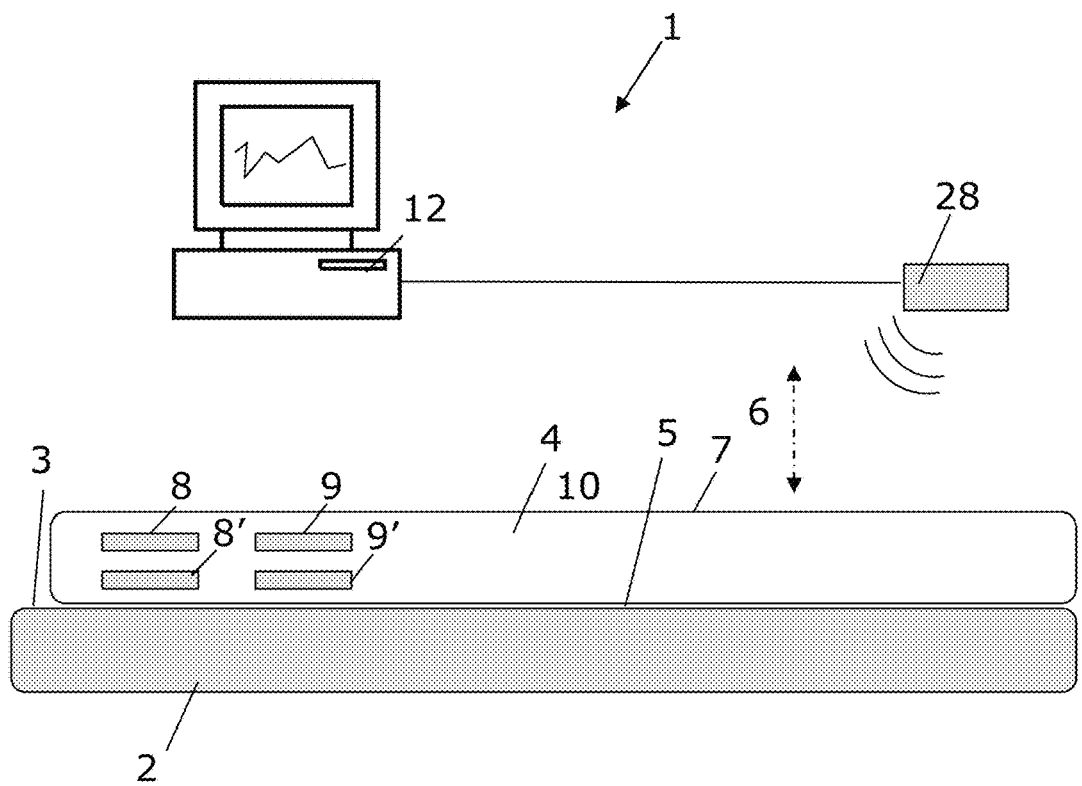

FIG. 1b illustrates an embodiment where the electrodes 8, 9, 8', 9' are located above each other in different depth within the coating.

Figure 1C:
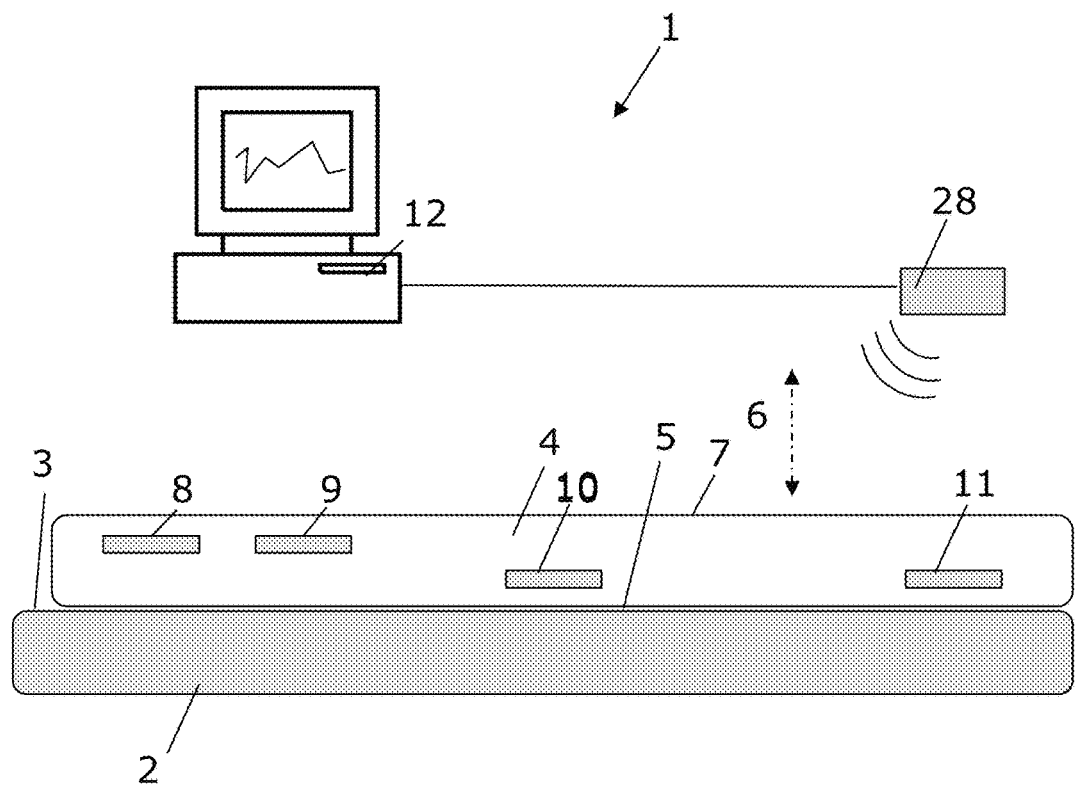

FIG. 1c illustrates an embodiment where the electrodes 8, 9, 10, 11 are located shifted relative to each other and in different depth within the coating.

Figure 1D:
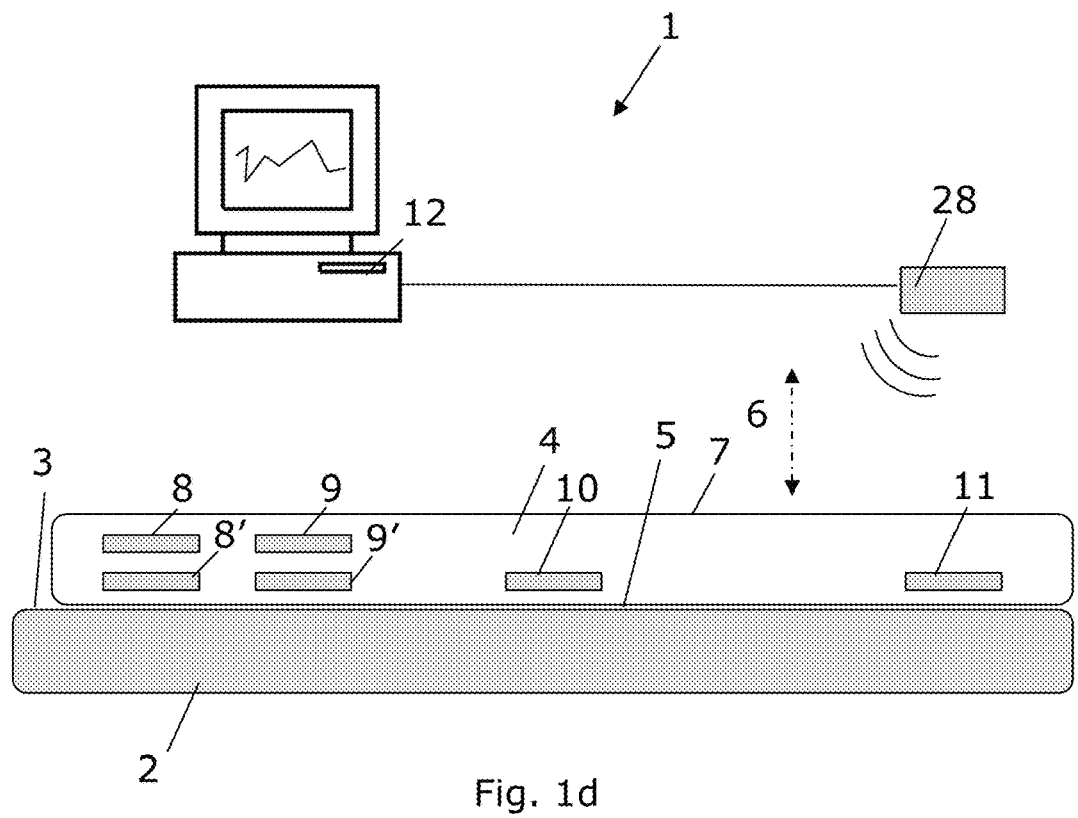

FIG. 1d illustrates an embodiment where the electrodes 8, 9, 8', 9' are located above each other in different depth within the coating and further including electrodes 10, 11 located shifted relative to each other electrodes. In the illustrated embodiment, electrodes 10, 11 are located in the same level as electrodes 8' and 9', but they could also be located in a level different from the other electrodes within the coating.

Figure 2:
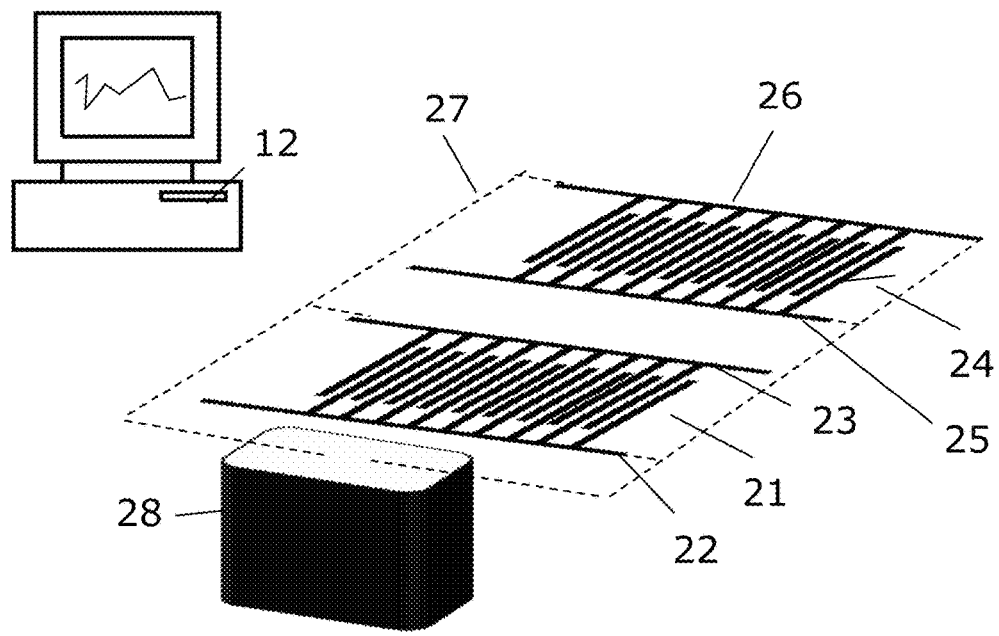
FIG. 2 illustrates an embodiment with four electrodes arranged in two pairs and in a comb pattern.

FIG. 2 illustrates an embodiment in further details. The first set of electrodes 21 defines the first and second electrodes 22, 23 as interleaved conductors and the second set of electrodes 24 defines the third and fourth electrode 25, 26 as interleaved conductors.

Each pattern is wired by a bus structure 27, to a powering, and signal transmitting local I/O device 28. This device comprises a CPU-unit and is configured to provide an input signal with different frequencies.

The local I/O device 28 energizes the patterns and transmits the received response signal from the patterns via the bus-wire 27. The local I/O device 28 may e.g. be configured for an AC output signal with a frequency of 10 µHz up to 1 MHz, a current range or 100 pA to 10 mA, and a potential range of ±5 mV or ±10 V.

The local I/O device 28 may communicate the response signal or a signal derivable from the response signal to computer unit 12, and it may comprise an internal storage to allow intermittent communication with the computer unit 12. By inclusion of an internal storage, the local I/O device further defines a data logger which can log the data from the sensor. The data logging may also be carried out in a separate computer unit between the local I/O device 28 and the computer unit 12. The local I/O device 28 may e.g. be constituted by a PalmSens4' from the company PalmSens, or potentiostat/Galvanostat CS350 from the company Contest Instruments, or similar commercially available potentiostat, galvanostat or similar impedance analyzing devices.

Additionally, it may comprise a multiplexer to share the signal between a plurality of sets of electrodes. Another available potentiostat could be Ivium, PocketSTAT2, from the company Ivium Technologies.

The local I/O device could be independently powered, e.g. by solar cells or battery etc. In one embodiment, the local I/O device is very slim and arranged on or even under or in the coating.

The computer unit 12 is configured for further processing of the response signal, configured for presentation of a result based on the response signal, or for collecting and optionally comparing and/or presenting response signals from a plurality of local I/O devices 28 each connected to two or more patterns via a bus-wiring. The computer unit 12 also includes a data logger for gathering the collected data.

Figure 3:
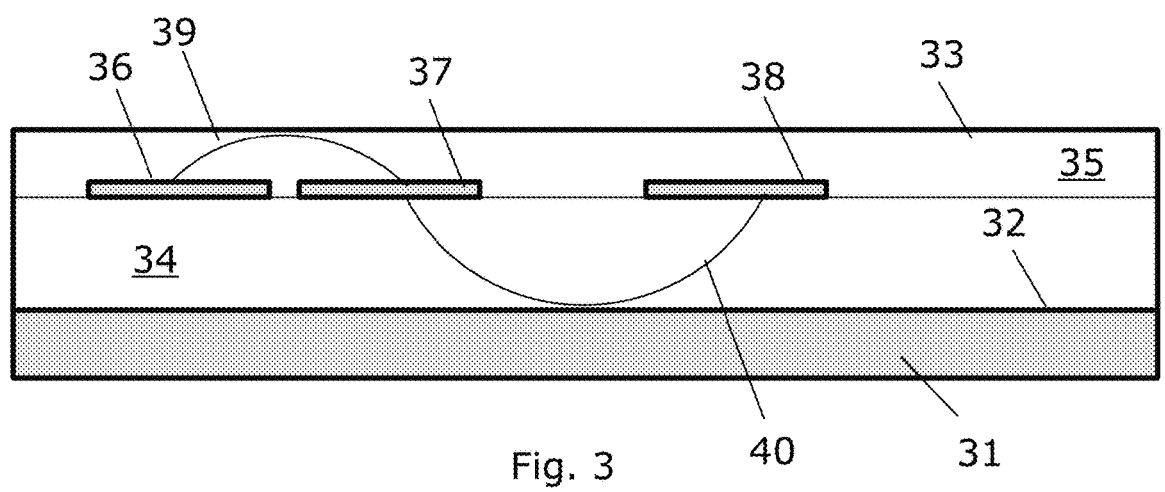
FIG. 3 illustrates three electrodes forming two pairs of electrodes.

FIG. 3 illustrates schematically one implementation of the electrodes. In this embodiment, the base 31 has a base surface 32 covered by coating 33. The coating is made of a first layer 34 of paint and a second layer 35 of paint. The two layers have different layer thickness. The electrode structure is arranged between the layers, and is constituted by a first electrode 36, a second/third electrode 37 and a fourth electrode 38. The second and third electrode is the same electrode, and two sets of electrodes are formed by a total of three electrodes.

A first electrical signal between the first electrode 36 and the second/third electrode 37 defines a first electrical field 39, and a second electrical signal between the second/third electrode 37 and the fourth electrode 38 defines a second electrical field 40.

The two electrical fields have different field curves for one specific field strength. As illustrated schematically in FIG. 3, the field curve 39 extends to the outer coating surface, whereas the field curve 40 extends base surface and covers the base interface between the base and the coating.

Figure 4:
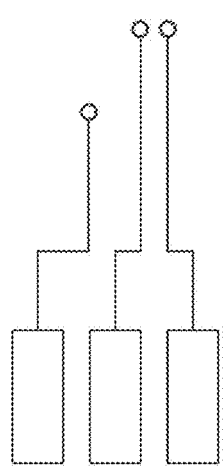
FIGS. 4-5 illustrate two sensors with different numbers of electrodes.

FIG. 4 illustrates the electrode configuration schematically.

Figure 5:
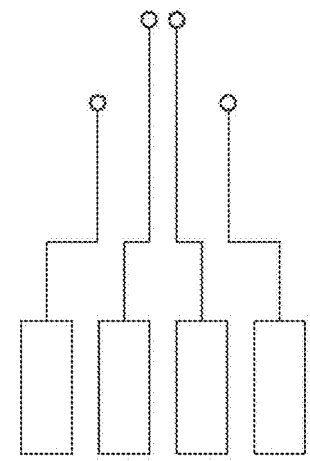

FIG. 5 illustrates an alternative electrode configuration wherein the first set comprises a first electrode and a second electrode, and the second set comprises a third electrode and a fourth electrode. In this setup, the two sets of electrodes are defined by use of four electrodes.

Figure 6:
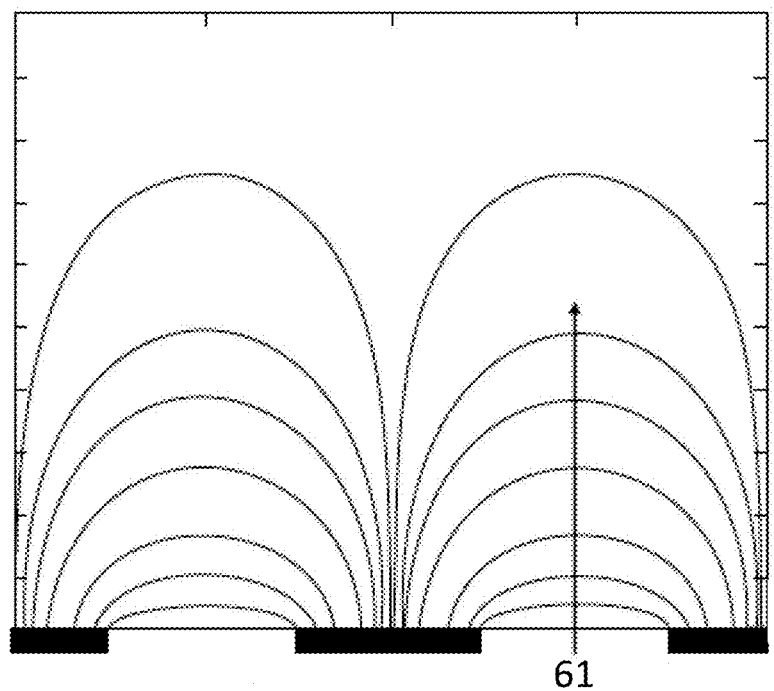
FIG. 6 illustrates detection volume.

FIG. 6 illustrates electric field volume, where 61 is distance between the electrodes and the curves shows different percent of current flowing within the volume. When AC-potential is applied between two electrodes, an electric current is induced with consequently formed electric field. The electric field gives the volume of detection. If the focus is on coating degradation, the magnetic fields need be constricted within the coating. The electrical field volume percentage shows the magnitude of current under the curve.

Figure 7:
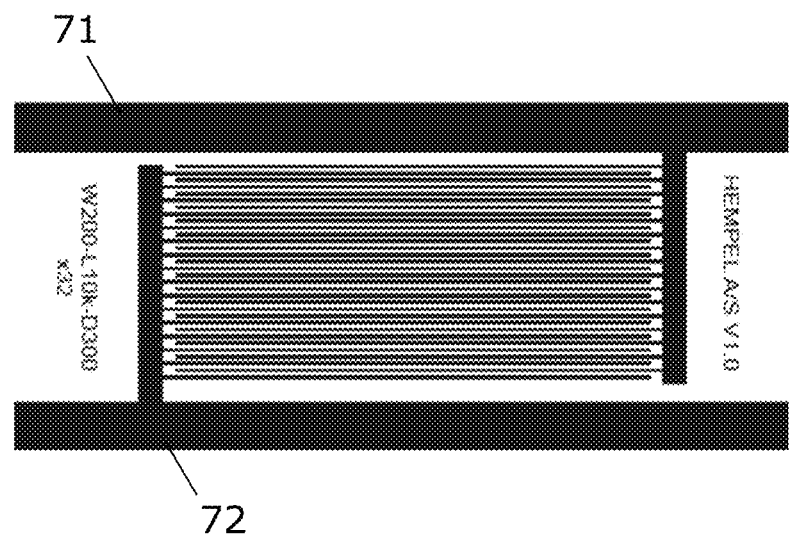
FIG. 7 illustrates two electrodes in comb pattern with interleaved fingers.

FIG. 7 in which a set of electrodes comprises a first electrode 71 forming fingers and a second electrode 72 forming fingers interleaved between the fingers of the first electrode.

Figure 8:
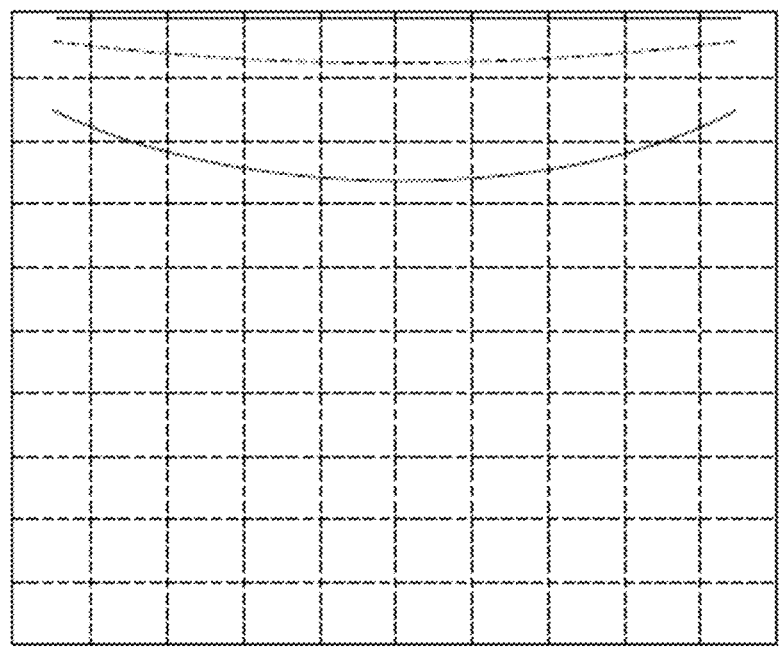
FIG. 8 illustrates a ratio between a spacing ratio and current through the electrodes.

FIG. 8 illustrates in a graph relationship between, on the abscissa a spacing ratio ($W_{sp}/L$), where $W_{sp}$ is the spacing between adjacent electrodes and L is the distance from the center of one electrode to the center of the adjacent electrode. On the ordinate, the current through layers of the thickness indicated on each of the three graphs. The upper graph illustrates a thickness of the coating being 0.8 times the distance L between the electrodes, the middle graph illustrates a thickness of the coating being 0.4 times the distance L between the electrodes, and the lower graph illustrates a thickness of the coating being 0.2 times the distance L between the electrodes.

Figure 9:
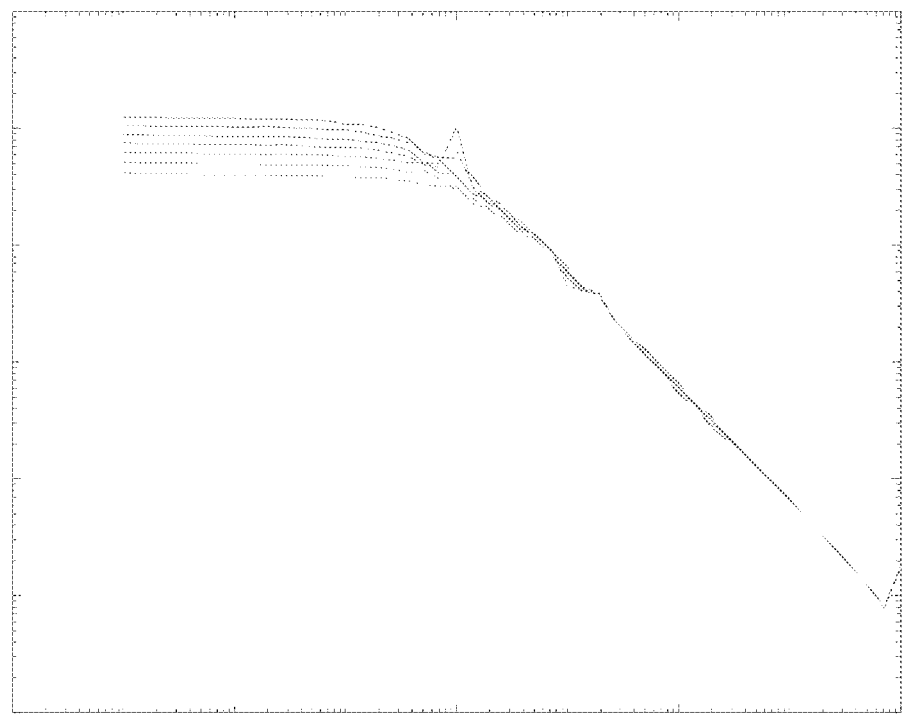
FIG. 9 illustrates an output signal.

FIG. 9 illustrates an output signal, where the absolute value of the impedance, Zabs (ohms) in the total frequency range, from to 1E5 Hz to 0.1 Hz, is plotted. The different curves represent measurements done at different times. As time progresses, the curve is shifted towards low Zabs values in the low frequency range.

Figure 10:
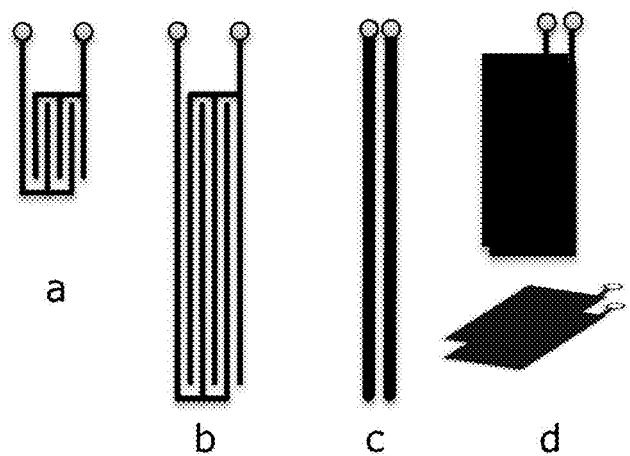
FIG. 10 illustrates four different sensors each comprising two electrodes.

FIG. 10 illustrates four different sensors each comprising 2 electrodes, i.e. a 2 electrode pattern. This type of sensor is suitable for detecting coating degradation, corrosion, and water detection e.g. by EIS. Sensors a and b form comb patterns with interleaved fingers. The number of fingers of the comb and the spacing may vary. Sensor c form oblong parallel lines. The spacing between the lines may vary. The sensor d form plate shaped electrodes arranged at a distance which may vary. The plates may be in different layers of the coating, e.g. applied between different coating layers. The plates may be applied with or without insulating layers in between.

Figure 11:
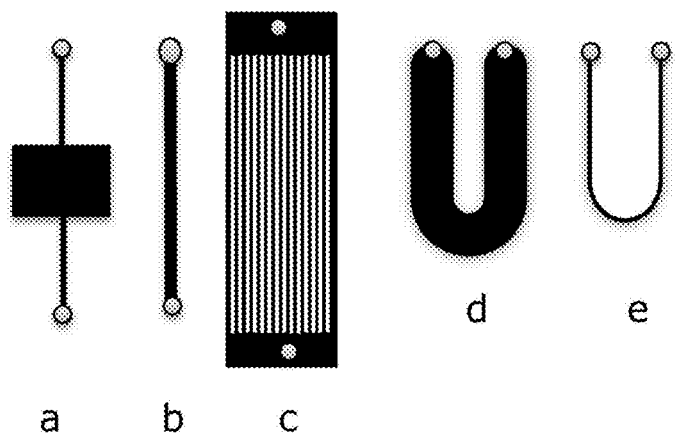
FIG. 11 illustrates 5 different sensors each comprising one electrode.

FIG. 11 illustrates 5 different sensors each comprising one single electrode, i.e. a 1 electrode pattern. The 1 electrode pattern is suitable for detecting cracking.

Sensors b, d, and e are long sensors in 1 dimension. It can be e.g. from a few centimeters up to several meters. It is suitable for cracking detection where a crack in the coating may destruct the electrode and thereby create a very significant increase in resistance from one end of the electrode to the opposite end of the electrode.

Sensors a and c are two dimensional sensors including one single electrode and they are suitable for area mapping, e.g. from 0.1 square meter up to several square meter.

The 1 electrode pattern sensor can be combined with the 2-electrode pattern to obtain a combined sensing of separate indexes.

Figure 12:
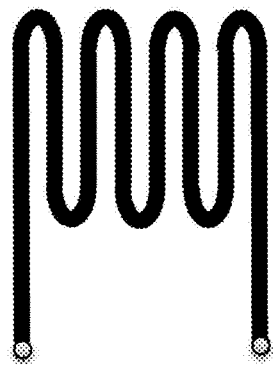
FIG. 12 illustrates an electrode pattern with a meandering shape.

FIG. 12 illustrates a particular embodiment of a 1 electrode pattern with a meandering shape.

Figure 13:
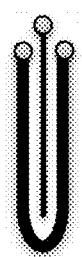
FIGS. 13 and 14 illustrate a 2 electrode pattern suitable for degradation, water detection, corrosion detection and cracking.
Figure 14:
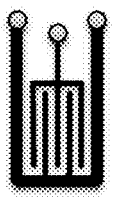

FIGS. 13 and 14 illustrate a 2-electrode pattern suitable for degradation, water detection, corrosion detection and cracking, all in one sensor. The combined impedance and resistance is possible with three electrode connection points, forming three electrodes by only two separate lines.

Experimental Section

Preparation of coated structures. Three different kinds of bases have been used, namely hot-rolled mild 235J steel panels, hot-rolled mild 235J steel pre-corroded panels and acrylic panels, all of dimensions 75×150×3 mm. The steel panels were abrasive blasted with iron grit (G070 acc. ISO 11124) to a cleanliness degree of Sa2½ Medium (G) (ISO 8503-1). The pre-corrosion was carried out by exposing the panels to 95% relative humidity at 30° C. for 48 hours, causing a homogenous flash rust layer on the base surface.

The bases were coated with four layers of a two-component Bisphenol A based epoxy paint (Hempadur mastic 45880) consisting of a base (epoxy component) and a curing agent (amine component) with mixing ratio 1:3 v/v. Each layer had a thickness of 150 microns and was applied to the base using an airless spray. The total dry film thickness (dft) of the coating was 600 microns. The three first layers were allowed to cure for one week, while the last forth layer cured for two weeks. In total, 144 coated structures were prepared.

Preparation of the coated structure with the monitoring system. One two-electrode sensor was embedded in each of the 144 coated structures. Three sensor designs were placed in between the four layers of paint (one sensor per each coated structure) at different locations, i.e. at 150 microns from the base surface (inner layer), at 300 microns from the base surface (intermediate layer), and at 450 microns from the base surface (outer layer). The three designs possessed a comb structure with different finger separation: 300 microns, 500 microns and 2,500 microns. The sensors were made from an ink made of silver nanoparticles and embedded between the coating layers by two different methods. The first method consisted in stamping a silver-containing ink on the coating layer, followed by heat curing. The second method implied the transfer of a conductive pre-printed sensor from a foil to the coating layer. Both methods resulted in well-functioning sensors with low sheet resistances.

Table 1 below indicates a matrix for the sensor-containing coated structures prepared. Experiments were made with three different base surfaces and three different sensor designs. Sensors were applied at three different depths and by two different application techniques. All combinations have been made e.g. steel as a base surface was combined with all three sensor designs, sensor locations and sensor application techniques and so on. At least three replicas for each combination of parameters were made.

TABLE 1

| Base surface | Sensor design | Sensor location | Sensor application technique |
|---|---|---|---|
| Steel | Comb structure 300 μm | 150 μm from base surface | Stamping |
| Pre-corroded steel | Comb structure 500 μm | 300 μm from base surface | |
| Acrylic | Comb structure 2,500 μm | 450 μm from base surface | Transfer |

Figure 15:
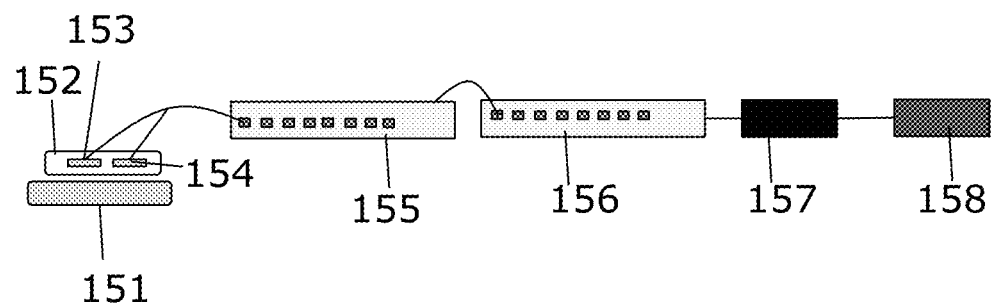
FIGS. 15-19 demonstrate experiments and results from experiments.

The I/O device is comprised of "Ivium CompactStat.h" potentiostat coupled with "Ivium HiMUX.XR" multiplexers enabling sequential measurements on 64 channels, and a computer. Each sensor was connected to one channel of a multiplexer through a cable connected to each of the two electrodes of the sensor, as illustrated in FIG. 15. Three I/O devices were used, two of them comprising eight multiplexers and the third one comprising two multiplexers. FIG. 15 illustrates A base 151, a coating 152, a sensor comprising two electrodes 153, 154, a multiplexer 155 with 8 channels, a coupler 156 with 8 channels, a potentiostat 157 and a computer 158.

Testing and experimental results. The coated structures with the embedded sensors were placed in a salt spray chamber where they were exposed to 5% NaCl fog at 35° C. for 14 weeks. Electrochemical impedance spectroscopy (EIS) measurements at 50 mV were carried out every 5 hours in each coated structure. The amplitude of the signal was 50 mV and 61 frequencies were swept, from 0.1 Hz to 1E5 Hz to. FIG. 9 shows an example of the typical spectra obtained at the beginning of the experiment for all the panels. The EIS signal will respond to the changing environmental conditions posed on the entire system comprising the embedded electrodes in the coating.

When water penetrates the coating it initiates a range of subsequent processes. Firstly, the accumulation of water inside the pores and pockets of the coating causes the pore size to increase with water uptake which is a type of degradation. Secondly, the overall material electrical performance changes by alterations of the material conductivity and electrical permittivity measured as capacitance and resistance changes in the EIS signal response. This response can be further enhanced by corrosive ions that diffuse into the coating over time.

Figure 16:
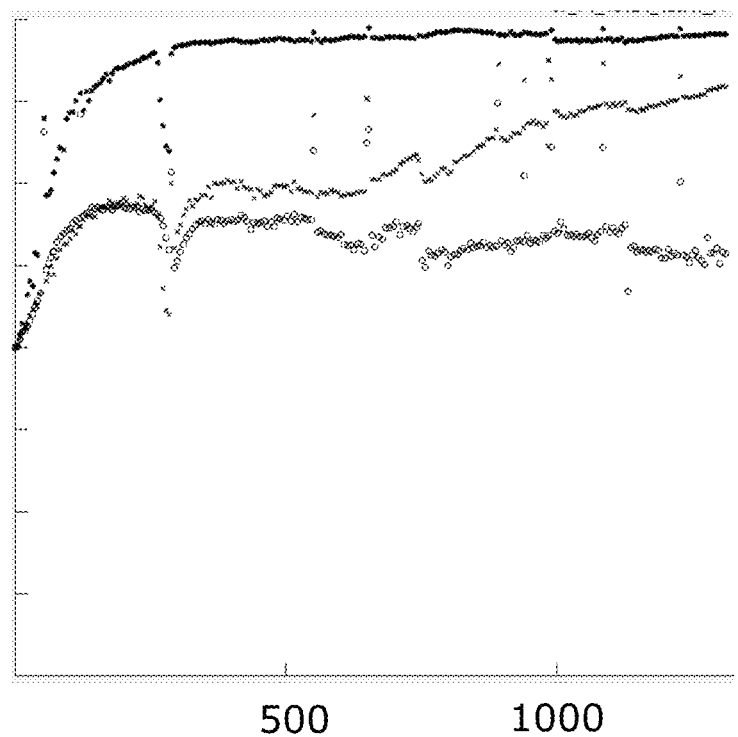
Figure 17:
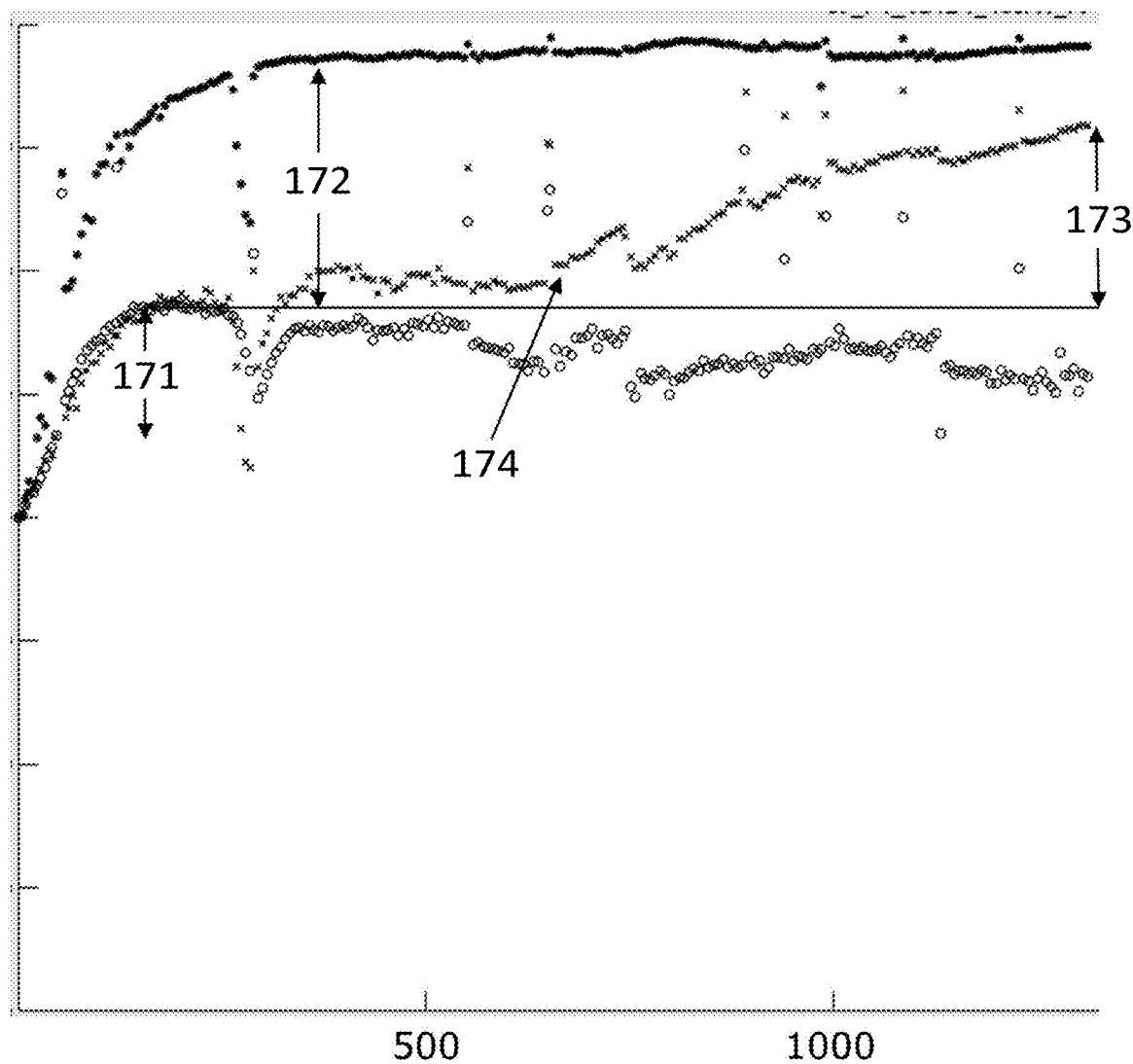

In FIGS. 16 and 17, the imaginary part of the impedance at high frequencies (100 kHz) is plotted against the elapsed experiment time, i.e., the abscissa shows elapsed time in hours, and the ordinate shows 1 m(ohm) rel[%].

FIGS. 16 and 17 are plotted for the sensors located at 150 microns (inner layer, "o"), 300 microns (intermediate layer, "x") and 450 microns (outer layer, "*") from the base surface. The behavior is representative of all the coated structures. There is an initial increase of the imaginary part occurring in the first 150 hours in the case of structures with sensors located in the inner and intermediate layers. When the electrode is located in the outer layer, the increase is extended up to 300 hours. After that, the imaginary component reached a plateau, which is followed by a second increase after 600 hours, c.f. where indicated with arrow 174, when the electrodes are embedded into the intermediate layer.

The initial increase of the imaginary part is related to the water uptake. Water starts to diffuse through the coating and saturates after approximately 200 hours when the electrodes are located in the inner and intermediate layers. For this type of coating and under the outlined experimental conditions this applies to the electrodes at 150 microns and 300 microns from the base. When the electrodes are located in the outer layer, in our case the electrodes at 450 microns from the base, a secondary process involving degradation as well as ion transport cannot be separated from the water uptake signal, causing a further increase of the imaginary part with a signal time response extending up to 350 hours. In order to distinguish between the two initial situations (171–water uptake or 172–water uptake+degradation), the entire complex impedance in the total frequency range should be evaluated:

1. If the increase is caused purely by water uptake in the coating, the entire EIS signal decreases with a flattening in the lower frequencies.
2. If the increase is caused by a combination of water uptake and degradation and ion transport, the EIS complex impedance curve changes shape entirely.

After this initial increase, independently of whether the coating is already suffering from any kind of process involving degradation and ion transport, a plateau is reached. This corresponds to a situation in which the coating layer is fully saturated with water. After approximately 600 hours, a second increase of the imaginary component is observed when the electrodes are located in the intermediate layer. This corresponds to a situation in which degradation and ion transport processes are starting to occur, and in this specific case is extended for around 1,500 hours.

In summary, in this specific example one sensor has been used to evaluate more than one property of the coating, namely water diffusion, degradation and ion presence.

Figure 18:
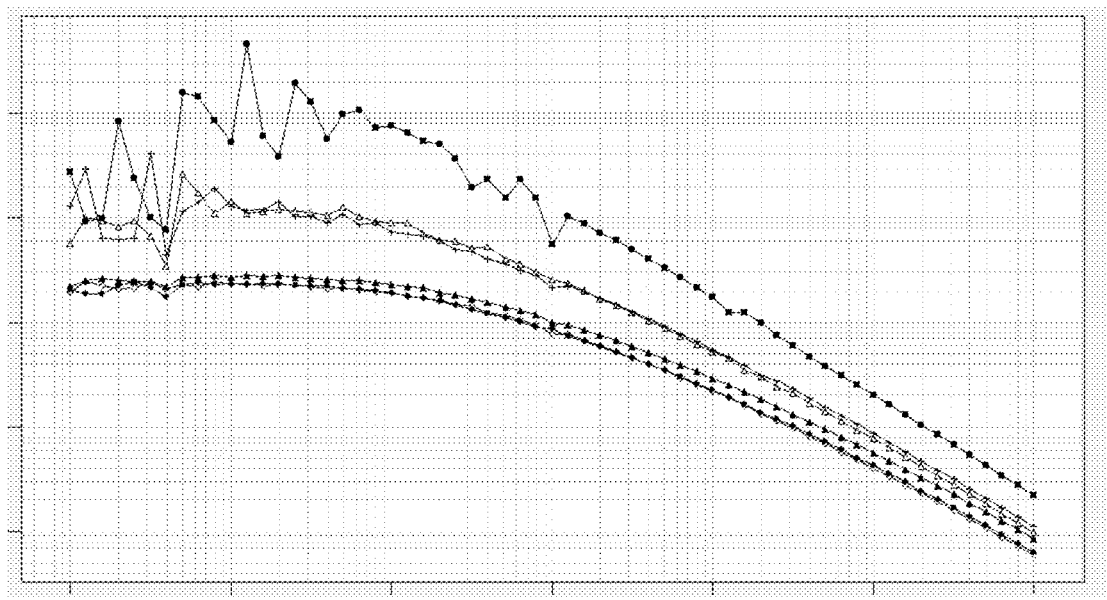

The electrodes located in the outer layer (450 microns in this example) of the coating structure are also sensitive towards humidity and liquid water on the surface of the coated structure. The detection occurs instantaneously for the three different sensor designs, as shown in FIG. 18, where the EIS spectra for coated structures with sensors located in the outer layer is plotted. In FIG. 18, the abscissa shows 10 log(frequency)/Hz, and the ordinate shows 10 log(Z)/ohm.

The measurements were done when the structures were dried and after adding approximately 3 ml of liquid water on top of the coated structure surface, denoted as "dry" and "wet", respectively. The response towards liquid water was measured for the three different sensor designs: Comb structure with finger separation of 300 microns (Δ "dry", ◊ "wet"), comb structure with finger separation of 500 microns (+ "dry", ♦ "wet") and comb structure with finger separation of 2,500 microns (■ "dry", ▲ "wet"). For the three sensor designs, the modulus of the impedance at high frequencies, which is related to the capacitance of the coating, decreases when water is on the surface of the coated structure (denoted as "wet"), proving that the three sensor designs are sensitive towards liquid water. This decrease has a similar magnitude for the comb structures with finger separation of 300 microns and 500 microns (4,000 ohms), while is larger when the comb structure possesses a finger separation of 2,500 microns (10,000 ohms). This indicates that the last design possesses a larger sensitivity towards liquid water.

The same experiment was done for the coated structures with embedded sensors in the intermediate layer. In this case the EIS spectra remained constant, independently of the presence of liquid water. Humidity detection is dependent of the position of the sensor in the coated structure.

Index General Formulation

A general index is defined to provide comparable insight into the coating property changes over its life-cycle when exposed to different environmental conditions, like varying temperature T, humidity RH, pressure p etc. In addition to the environmental conditions, a measurement of the complex impedance is performed at a time t and frequency f. Measurements over an entire frequency domain for fixed environmental conditions, can be linked to equivalent circuit components, most commonly resistors and capacitors, e.g. by fitting. Accordingly, when evaluating the system changes, we look at changes in the equivalent circuit component values along with the complex impedance directly, measured over a different time period, while also accounting for the environmental variation, to make the measurement comparable; that is, A(t, f, T, RH, p, . . . ), where A is one of the just mentioned properties of the system: complex impedance Z, equivalent circuit component, e.g. resistor R or capacitor C, or other circuit components. But also include the real and imaginary part of the complex impedance individually, i.e. $A=\Im(Z)$ and $A=\Re(Z)$, as well as the modulus of the complex impedance.

An index is then the mapping of the change of a property measured at different times under comparable adjusted environmental conditions, designated $A_n$, we have, $$I(A)=g(A_1, A_2, \ldots, A_N) \quad \text{(G1)}$$

Where g is the function describing the change, which could for two indexes look like, $$g(A_1, A_2) = \frac{\Delta A}{A_1} = \frac{A_2(t_2, f, T, RH, p, \ldots) - A_1(t_1, f, T, RH, p, \ldots)}{A_1(t_1, f, T, RH, p, \ldots)} \quad \text{(G2)}$$

Of course, g, can defined more 'strongly' with multiple inputs, to provide more accuracy with predictive algorithms in describing the change. Sometimes, for practical reasons, the sign convention is changed to express reductions as positive and the ratio can be expressed in percentages. Also, a time derivative of g can be computed, to evaluate the rate of change of the system.

The above index structure is universal but produces many different indexes depending on the situation which can be distinguished by a series of indicators. In these situations, specific indicators have to be evaluated during the analysis of the coating material properties to compute an appropriate index, and they can be accompanied by a subset of supporting equations that must be satisfied. We now present these indicators, but firstly, we will explain the order of events. 1) water detection sometimes distinguishes as water on surface and water uptake, 2) coating degradation and ion transport, 3) corrosion. While this is generally the order of events, some of the events are reversible, e.g. due to temperature cycles. However, certain characteristics are present for the non-reversible events, which helps identifying what is occurring when. The following lists these indicators as well as general example definitions of suitable indexes. Where " . . . " is taken as an input representing comparable environmental conditions.

1. Water Detection (SW)
   I. Sensors closest to the surface will react first, and sensors located closest to the base will react last. This can be used to monitor progress over time.
   II. If temperatures are below water evaporation point:
   III. Faster response than the other events.
   IV. Water on surface faster than water uptake.
   V. Decrease in the modulus of complex impedance for all frequencies $$I_{SW-Z} = \frac{-\Delta |Z|}{|Z_0|} = \frac{|Z_0(f, t_0, \ldots)| - |Z_1(f, t_1, \ldots)|}{|Z_0(f, t_0, \ldots)|} > 0$$

For all frequencies in the range 0.1 Hz to 100 kHz. The derivative is $$I_{\dot{SW}-Z} = \frac{d}{dt}(I_{SW-Z})$$

VI. Larger capacitance and/or imaginary part of the complex impedance $$I_{SW-ImZ} = \frac{-\Delta \mathcal{J}(Z)}{\mathcal{J}(Z_0)} = \frac{\mathcal{J}(Z_0(f, t_0, \ldots)) - \mathcal{J}(Z_1(f, t_1, \ldots))}{\mathcal{J}(Z_0(f, t_0, \ldots))} > 0$$

and/or $$I_{SW-C} = \frac{\Delta C}{C_0} = \frac{C_1(t_1, \ldots) - C_0(t_0, \ldots)}{C_0(t_0, \ldots)} > 0$$

If temperatures are above water evaporation point, the reverse can be observed.

2. Degradation and Ion Transport (DI)
   I. Sensors closest to the surface will react first, and sensors located closest to the base will react last. This can be used to monitor progress over time.
   II. Decrease in the modulus of complex impedance for all frequencies $$I_{DI-Z} = \frac{-\Delta |Z|}{|Z_0|} = \frac{|Z_0(f, t_0, \ldots)| - |Z_1(f, t_1, \ldots)|}{|Z_0(f, t_0, \ldots)|} > 0$$

For all frequencies in the range 0.1 Hz to 100 kHz. The derivative is $$I_{\dot{DI}-Z} = \frac{d}{dt}(I_{DI-Z})$$

III. Resistance will increase $$I_{DI-R} = \frac{-\Delta R}{R_0} = \frac{R_0(t_0, \ldots) - R_1(t_1, \ldots)}{R_0(t_0, \ldots)} > 0$$

IV. Shape of the complex impedance changes

3. Water detection, Degradation and Ion Transport
   I. Sometimes water detection, degradation and ion transport are inseparable and will occur at the same time.

4. Corrosion (C)
   I. Capacitance of the coating, obtainable in the high frequency domain (resulting from the Imaginary part of impedance), exceeds the level of saturation of a coating in the given conditions. This can be explained as when corrosion starts at the base-coating interface, it results in loss of adhesion which leads to creation of new more porous interface that under humid conditions can hold more water i.e. in a form of a blister. This phenomenon is typically followed by the reduction of impedance in the entire spectrum.

$$I_{C-C} = \frac{\Delta C}{C_0} = \frac{C_1(t_1, \ldots) - C_0(t_0, \ldots)}{C_0(t_0, \ldots)} > 0$$

II. Impedance at low frequency decreases below the level typical for coating in equilibrium with the environment i.e. saturated with water at given temperature condition. This results from reduction of electrical resistance of the coating close to the base-coating interface, which happens due to deterioration of the coating and leaching of corrosion products into the coating, which are more conductive than the coating in its original state.

$$I_{C-Z} = \frac{-\Delta |Z|}{|Z_0|} = \frac{|Z_0(f, t_0, \ldots)| - |Z_1(f, t_1, \ldots)|}{|Z_0(f, t_0, \ldots)|} > 0$$

Where f are low frequencies less than 1 Hz.

III. The third corrosion indicator is appearance of new time constant in the impedance spectrum. This is a result of creation of the new interface, across which the charge transfer is frequency dependent. In a simplified manner it can be seen as formation of double layer capacitance and charge transfer resistance.
   IV. Careful evaluation is often required to distinguish degradation from corrosion, as they can appear similarly in the figures. However, the first takes place in the bulk and the latter at the interface between the coating and the base. This can be solved by placing sensors at different coating depths, to measure the bulk and the coating-base interface respectively.

Example of Applying the General Index Formulation.

FIG. 16 display an index for the change in the imaginary part of the complex impedance given as $$I(t) = \mathcal{J}\left(\frac{Z(f = 10^5, t = 0) - Z(f = 10^5, t)}{Z(f = 10^5, t = 0)}\right)$$

Measured at different time t throughout the experiment for panels at 150 um (circles), 300 um (x) and 450 um.

We here describe how this index is linked to different phenomena. Looking at FIG. 17:

1. Water uptake
   Arrow 1: Water uptake for panels at 150 um and 300 um. Increase happens within shorter time duration (~200 hours) and saturates.
2. Water uptake, degradation and ion transport
   Arrow 2: Water uptake, degradation and ion transport for panel 450 um. Happens within a short time duration, yet longer than the above (~350 hours). Furthermore, the response is much larger, hence multiple phenomena occurs simultaneously.
3. Degradation and ion transport
   Arrow 3: panel at 300 um now increases further towards 1500 hours. Furthermore, other indexes and shape changes to become more similar with the 450 um panel.
4. Transition from coating degradation to corrosion
   Corrosion of the base is often a result of coating degradation, thus both processes are likely to take place simultaneously. Both processes have a characteristic of reduction of impedance below the values of the coating in the equilibrium with environment in its initial stage of lifetime. Corrosion of the base, however, can cause more pronounced decrease of impedance than degradation alone, and the interfacial changes at the coating-base are accompanied by new time constants in the impedance spectra. These are general indicators for coating state evaluation from single sensor measurement, however the accuracy of impact estimation of corrosion and degradation can be greatly improved by assessment of impedance response obtained from embedded sensors in different depths of the coating.
   Following example in FIG. 19. aims to show typical transitions in EIS spectrum that can be linked to various stages of coating ageing, as achieved in accelerating test in this case.

Figure 19:
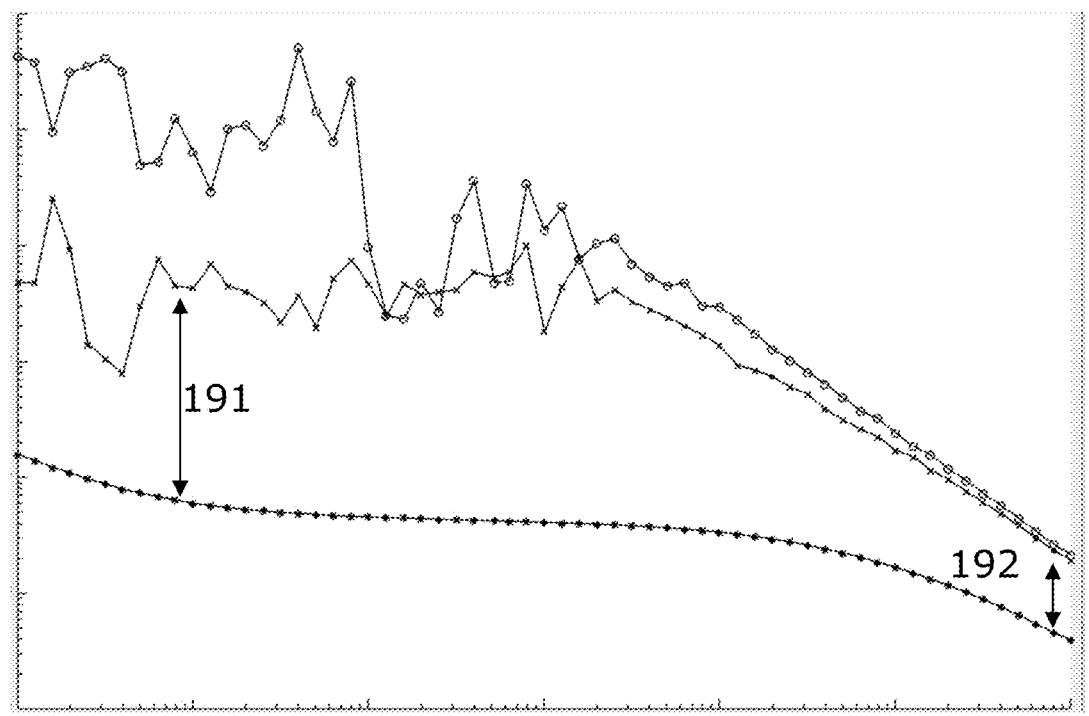

FIG. 19 shows the first measurement of the modulus of the impedance (circles), a measurement after initial saturation at ~200 hours (x), similar to after water uptake in FIG. 17, and a last measurement at 1450 hours (*). In FIG. 19 the abscissa shows frequency/Hz, and the ordinate shows Zabs [ohm].

As coating severely degrades, the curve changes characteristics, with certain indications. Looking at the change from the ~200 hours curve to ~1450 hours curve:

I. Decreases of impedance at lower frequencies (arrow 191)
II. Decrease of impedance at high frequency (arrow 192)
III. General change in the overall shape of the spectrum

LIST OF NUMBERED EMBODIMENTS

1. A coated structure with a monitoring system (1), the coated structure comprising a base (2) having a base surface (3), a coating (4) joined to the base surface in a base interface (5) and extending in a thickness direction (6) to an outer coating surface (7), a sensor (8, 9, 10, 11) comprising at least one electrode embedded in the coating, an I/O device (28) configured to generate an input signal in the sensor and to read an output AC signal from the sensor, a data logger (28) configured to log the output signal from the I/O device, and a computer unit (12) configured to process the logged signal from the data logger to determine at least two separate indexes, each index related to a property of the coating or the base.
2. The structure according to embodiment 1, wherein the sensor comprises at least two electrodes.
3. The structure according to embodiment 1 or 2, wherein the computer unit is configured to determine at least one of the at least two indexes by electrochemical impedance spectroscopy (EIS).
4. The structure according to any of the preceding embodiments, wherein the computer unit is configured to determine at least one of the two indexes by an input signal in the form of impulses, or waves or triangles, or alternating current.
5. The structure according to any of the preceding embodiments, wherein the sensor comprises at least three electrodes, and wherein the computer unit is configured to determine one of the two indexes by EIS by use of a first set of two of the three electrodes, and to determine the other of the two indexes by EIS by use of a second set of two of the at least three electrodes.
6. The structure according to embodiment 5, wherein the first set comprises a first electrode and a second electrode, and the second set comprises the second electrode and a third electrode.
7. The structure according to any of embodiments 1-5, wherein the sensor comprises at least four electrodes, wherein the first set comprises a first electrode and a second electrode, and the second set comprises a third electrode and a fourth electrode.
8. The structure according to any of embodiments 5-7, wherein the input signal defines a first electrical field between the first set of electrodes and a second electrical field between the second set of electrodes, and wherein the first and second electrical fields define field curves with different size or shape.
9. The structure according to embodiment 8, wherein the field curve of the first electrical field are smaller than the field curve of the second electrical field for a specific field strength.
10. The structure according to embodiment 8 or 9, wherein the field curve of the first electrical field for a specific field strength extends to the outer coating surface, and the field curve of the second electrical field for the specific field strength does not extend to the outer coating surface.
11. The structure according to any of embodiments 8-10, wherein the field curve of the first electrical field for a specific field strength extends to the base interface, and the field curve of the second electrical field for the specific field strength does not extend to the base interface.
12. The structure according to any of embodiments 5-11, wherein the distance between the electrodes of the first set of electrodes is different from the distance between the electrodes of the second set of electrodes.
13. The structure according to any of embodiments 7-12, wherein the size of the electrodes of the first set of electrodes is different from the size of the electrodes of the second set of electrodes.
14. The structure according to any of embodiments 7-12, wherein the shape, the configuration, and/or the material of the electrodes of the first set of electrodes is different from the shape, configuration and/or the material of the electrodes of the second set of electrodes.

15. The structure according to any of the preceding embodiments, wherein the computer unit is configured to use the logged signal to define the at least two separate indexes simultaneously.

16. The structure according to any of the preceding embodiments, wherein the coating comprises at least a first layer and a second layer, each layer comprising opposite inner and outer surfaces, the inner surfaces being joined in a coating interface and the outer surface of the first layer being joined to the base in the base interface.

17. The structure according to embodiment 16, wherein at least one of the at least two electrodes of the sensor is located in the coating interface.

18. The structure according to any of embodiments 16-17, wherein the first layer has a first thickness and the second layer has a second thickness being different from the first thickness.

19. The structure according to any of the preceding embodiments, wherein one of the at least two indexes relates to the base interface and another of the at least two indexes relates to the outer coating surface.

20. The structure according to any of the preceding embodiments, wherein the computer unit is configured to use resistance in one of the at least two electrodes of the sensor to determine an index related to cracking in the coated structure.

21. The structure according to any of the preceding embodiments, wherein the computer unit is configured to receive configuration data being logged during curing of the coating and to generate a reference pattern based on the configuration data, the computer unit further being configured to use the reference pattern to determine a level degradation of the coating.

22. The structure according to embodiment 21, further comprising a temperature sensor configured to determine a temperature of the coating and wherein the computer unit is configured to receive temperature data from the temperature sensor.

23. The structure according to embodiment 22, wherein the computer unit is configured to use the temperature data in the process of determining the level of degradation of the coating.

24. The structure according to embodiment 21-22, wherein the computer unit is configured to use the reference pattern by comparing the reference pattern with logged output data.

25. The structure according to any of the preceding embodiments, wherein the computer unit is configured to provide one of the at least two indexes so that it relates to a property selected from the group consisting of: presence of water, degradation of the coating, cracking of the base and/or coating, and corrosion of the base, and wherein the computer unit is configured to provide another of the at least two indexes so that it relates to the same or another property selected from the same group.

26. The structure according to any of the preceding embodiments, wherein the computer unit is configured to provide a combined value of the two separate indexes.

27. The structure according to any of the preceding embodiments wherein the combined value is calculated from a predefined function of the at least two separate indexes.

28. The structure according to any of the preceding embodiments, comprising at least two electrodes located in the same level in the coating, and wherein two of the at least two indexes relate to signals logged from electrodes in the same level.

29. The structure according to any of the preceding embodiments, comprising at least two electrodes located in different levels in the coating, and wherein two of the at least two indexes relate to signals logged from electrodes in different levels.

30. The structure according to any of the preceding embodiments, comprising at least two electrodes located in different levels in the coating and shifted sideways in a direction parallel to the base surface relative to each other, and wherein two of the at least two indexes relate to signals logged from electrodes in different levels.

31. The structure according to any of the preceding embodiments, wherein the I/O device is configured to generate the input signal in the form of a frequency sweep, and wherein the computer unit (12) is configured to use the logged signal from the data logger and to determine at least two separate indexes based on the same frequency sweep.

32. The structure according to any of the preceding embodiments, comprising at least one external electrode which is not embedded in the coating, the external electrode being attached to the outer coating surface.

33. The structure according to any of the preceding embodiments, wherein the I/O device is configured to generate the input signal with different characteristics including a sinus shaped AC signal and a pulsed DC signal, and wherein the computer unit is configured to process the logged signal from input signals of one of the characteristics to determine a first index, and from the other one of the characteristics to determine a second index.

34. The structure according to any of the preceding embodiments, wherein the computer unit is programmed with a first algorithm applied to the output signal to obtain a first index and programmed with a second algorithm applied to the output signal to obtain a second index.

35. The structure according to any of the preceding embodiments, forming an insulated structure where the coating is located between the base and an insulation material.

36. The structure according to any of the preceding embodiments, wherein the base forms a pipe.

37. The structure according to any of embodiments 1-35, wherein the base forms the inside of a tank, such as the inside of a storage tank or ballast tank.

38. A monitoring system for integration in a coated structure, the coated structure comprising a structure having a base surface, a coating joined to the base surface in a base interface and extending in a thickness direction to an outer coating surface, and a comprising at least one electrode embedded in the coating,
the monitoring system comprising:
an I/O device configured to generate an input signal in the sensor and to read an output signal from the sensor,
a data logger configured to log the output signal from the I/O device, and a computer unit configured to process the logged signal from the data logger to determine at least two separate indexes, each index related to a property of the coating or structure.

40. The monitoring system according to embodiment 39, wherein the I/O device is configured to generate the input signal in the form of a frequency sweep, and wherein the computer unit (12) is configured to use the logged signal from the data logger and to determine at least two separate indexes based on the same frequency sweep.

41. The monitoring system according to embodiment 39 or 40, wherein the computer unit is configured to provide a combined value of the two separate indexes.

42. The monitoring system according to any of embodiments 39-41, wherein the computer unit is configured to provide one of the at least two indexes so that it relates to a property selected from the group consisting of: presence of water, degradation of the coating, cracking of the base and/or coating, and corrosion of the base, and wherein the computer unit is configured to provide another of the at least two indexes so that it relates to the same or another property selected from the same group.

43. A method for monitoring a condition of a coated structure, the coated structure comprising a structure having a base surface, a coating joined to the base surface in a base interface and extending in a thickness direction to an outer coating surface, and a sensor comprising at least one electrode embedded in the coating, the method comprising the steps of:

generating an input signal in the sensor and reading an output signal from the sensor, using a computer unit for determining at least two separate indexes based on the output signal, each index related to a property of the coating or the structure.

44. The method according to embodiment 43, wherein at least one index is defined as a reference index obtained during curing of the coating.

The invention claimed is:

1. A coated structure with a monitoring system, the coated structure comprising:
a base having a base surface,
a coating joined to the base surface in a base interface and extending in a thickness direction to an outer coating surface,
a sensor comprising at least one electrode embedded in the coating,
an I/O device configured to generate an input signal in the sensor and to read an output signal from the sensor, wherein the output signal is an AC signal,
a data logger configured to log the output signal from the I/O device, and
a computer unit configured to process the logged signal from the data logger to determine at least two separate indexes, each index related to a property of the coating or the base;
wherein the at least two separate indexes express different properties and the at least two indexes are combined to define a condition value expressing a further condition of the coated structure which condition value depends on several separate indexes.

2. The coated structure according to claim 1, wherein said different properties are selected from water diffusion, degradation, ion presence, corrosion, or cracking.

3. The coated structure according to claim 1, wherein the computer unit is configured to determine at least one of the at least two indexes by electrochemical impedance spectroscopy (EIS).

4. The coated structure according to claim 1, wherein the computer unit is configured to determine at least one of the two indexes by the input signal in the form of impulses, or waves or triangles, or alternating current.

5. The coated structure according to claim 1, wherein the computer unit is configured to use the logged signal to define the at least two separate indexes simultaneously.

6. The coated structure according to claim 1, wherein the coating comprises at least a first layer and a second layer, each layer comprising opposite inner and outer surfaces, the inner surfaces being joined in a coating interface and the outer surface of the first layer being joined to the base in the base interface.

7. The coated structure according to claim 6, wherein at least one of the electrodes of the sensor is located in the coating interface.

8. The coated structure according to claim 6, wherein the first layer has a first thickness and the second layer has a second thickness being different from the first thickness.

9. The coated structure according to claim 1, wherein one of the at least two indexes relates to the base interface and another of the at least two indexes relates to the outer coating surface.

10. The coated structure according to claim 1, wherein the computer unit is configured to receive configuration data logged during curing of the coating, generate a reference pattern based on the configuration data, and determine a level of degradation of the coating based on the reference pattern.

11. The coated structure according to claim 1, wherein the computer unit is configured to provide one of the at least two indexes so that it relates to a property selected from the group consisting of: water diffusion, degradation, ion presence, cracking of the base and/or coating, and corrosion of the base, and
wherein the computer unit is configured to provide another of the at least two indexes so that it relates to the same or another property selected from the same group.

12. The coated structure according to claim 1, comprising at least two electrodes located in the same level in the coating, and
wherein two of the at least two indexes relate to signals logged from electrodes in the same level.

13. The coated structure according to claim 1, comprising at least two electrodes located in different levels in the coating, and
wherein two of the at least two indexes relate to signals logged from electrodes in different levels.

14. The coated structure according to claim 1, comprising at least two electrodes located in different levels in the coating and shifted sideways in a direction parallel to the base surface relative to each other, and
wherein two of the at least two indexes relate to signals logged from electrodes in different levels.

15. The coated structure according to claim 1, wherein the I/O device is configured to generate the input signal in the form of a frequency sweep, and wherein the computer unit is configured to use the logged signal from the data logger and to determine at least two separate indexes based on the same frequency sweep.

16. The coated structure according to claim 1, wherein the I/O device is configured to generate the input signal with different characteristics including a sinus shaped AC signal and a pulsed DC signal, and
wherein the computer unit is configured to process the logged signal from input signals of one of the characteristics to determine a first index, and from the other one of the characteristics to determine a second index.

17. The coated structure according to claim 1, wherein the computer unit is programmed with a first algorithm applied to the output signal to obtain a first index and programmed with a second algorithm applied to the output signal to obtain a second index.

18. A monitoring system for integration in a coated structure, the coated structure comprising a structure having a base surface, a coating joined to the base surface in a base interface and extending in a thickness direction to an outer coating surface, and a comprising at least one electrode embedded in the coating, the monitoring system comprising:
an I/O device configured to generate an input signal in the sensor and to read an output signal from the sensor,
a data logger configured to log the output signal from the I/O device, and
a computer unit configured to process the logged signal from the data logger to determine at least two separate indexes, each index related to a property of the coating or structure;
wherein the at least two separate indexes express different properties and the at least two indexes are combined to define a condition value expressing a further condition of the coated structure which condition value depends on several separate indexes.

19. The monitoring system according to claim 18, wherein the I/O device is configured to generate the input signal in the form of a frequency sweep, and
wherein the computer unit is configured to use the logged signal from the data logger and to determine at least two separate indexes based on the same frequency sweep.

20. The monitoring system according to claim 18, wherein the computer unit is configured to provide one of the at least two indexes so that it relates to a property selected from the group consisting of: presence of water, degradation of the coating, cracking of the base surface and/or coating, and corrosion of the base surface, and
wherein the computer unit is configured to provide another of the at least two indexes so that it relates to the same or another property selected from the same group.

* * * * *